US007995673B2

(12) United States Patent
Mitzel et al.

(10) Patent No.: US 7,995,673 B2
(45) Date of Patent: Aug. 9, 2011

(54) PROGRAM AND DATA ALERTS AND AUXILIARY DATASTREAMS IN A MULTICHANNEL BROADCAST SYSTEM

(75) Inventors: Kevin Mitzel, Ann Arbor, MI (US); Jeff Lockledge, Farmington Hills, MI (US); John Dombrowski, Ypsilanti, MI (US); David Birks, New Egypt, NJ (US); Ray Lowe, North Caldwell, NJ (US); Jerry Tarpley, Ann Arbor, MI (US)

(73) Assignee: Sirius Satellite Radio Inc., New York, NY (US)

( * ) Notice: Subject to any disclaimer, the term of this patent is extended or adjusted under 35 U.S.C. 154(b) by 838 days.

(21) Appl. No.: 10/585,007

(22) PCT Filed: Jan. 6, 2005

(86) PCT No.: PCT/US2005/000628
§ 371 (c)(1), (2), (4) Date: Nov. 2, 2007

(87) PCT Pub. No.: WO2005/069569
PCT Pub. Date: Jul. 28, 2005

(65) Prior Publication Data
US 2009/0124193 A1 May 14, 2009

Related U.S. Application Data

(60) Provisional application No. 60/534,751, filed on Jan. 6, 2004.

(51) Int. Cl.
*H04L 27/00* (2006.01)

(52) U.S. Cl. ..................... 375/295; 370/254; 370/395.3; 370/450

(58) Field of Classification Search .................. 375/295, 375/316; 370/254, 450, 395.3
See application file for complete search history.

(56) References Cited

U.S. PATENT DOCUMENTS

| | | | | |
|---|---|---|---|---|
| 2002/0176372 | A1 | 11/2002 | Ichikawa et al. | |
| 2003/0014767 | A1 * | 1/2003 | Stumphauzer, II | 725/131 |
| 2003/0067943 | A1 | 4/2003 | Arsenault et al. | |
| 2004/0249768 | A1 * | 12/2004 | Kontio et al. | 705/65 |

OTHER PUBLICATIONS

PCT International Search Report for PCT/US2005/000628 dated Jun. 10, 2005.

* cited by examiner

*Primary Examiner* — Ted M Wang
(74) *Attorney, Agent, or Firm* — Kramer Levin Naftalis & Frankel LLP

(57) ABSTRACT

A system and method (130, 135 and 140) for a user of a multichannel broadcasting service listening to a particular channel provides alerts about the content currently available on other channels which are of interest to the user. Auxiliary data streams of interest can be presented for display in conjunction with the audio transmission of a related or unrelated channel. The system and method include storing criteria associated with programming or auxiliary content of interest to a user and searching for unique identifiers within the broadcast signal signifying the availability of content which meets the criteria. Content of interest can be, for example, traffic information (105, 110, 120, 111 and 125), sports games available on other channels, sports scores, stock or other trading instruments prices, news headlines or travel information.

18 Claims, 25 Drawing Sheets
(11 of 25 Drawing Sheet(s) Filed in Color)

| MSG_ID (3 bits) | SEQ_ID (2 bits) | PAYLOAD_TYPE (3 bits) | RSVD (1 bit) | DOSC_ID (7 bits) | SEQ_NUM (0 or 8 bits) | PAYLOAD (N*8 bits) |
|---|---|---|---|---|---|---|

Total Length= N+3 bytes if SEQ_ID=0, 1, or 2
N+2 bytes if SEQ_ID=3

MSG_ID - "101" to indicate Data Descriptor Message

SEQ_ID - Sequence ID, defined as follows:
0 = Intermediate message in message sequence
1 = First message in message sequence
2 = Last message in message sequence
3 = Message is only message in message sequence PAYLOAD_TYPE - Type of PAYLOAD, defined as follows:
0 = Uncompressed
1 = Compressed using RHC algorithm
2-7 = Reserved RSVD - Reseved for future use DOSC_ID - Type of DOSC data SEQ_NUM - Sequence number which is modulo-256 (only present when SEQ_ID != 3)

PAYLOAD - Contains N bytes of data in the format specified by PAYLOAD_TYPE

Fig. 2 - Data Descriptor Message

| BOF | Field Type Value | Field Data | Field Delimiter | | Field Type Value | Field Data | Field Delimiter | EOF |
|---|---|---|---|---|---|---|---|---|
| 0x11 | 0xTT | xxxxxxx | 0x13 | ... | 0xTT | xxxxxxx | 0x13 | 0x12 |

First Character Sent

Maximum 128 Bytes

Last Character Sent

Field Type Values (0xTT):

0x0 = Reserved
0x1 = Artist
0x2 = Title
0x3 = Album
0x4 = Label
0x5 = Label ID
0x6 = Composer
0x7 = Alternate Artist
0x8 = Comments
0x9 = Category
0xA = Licensor 0x20 = Promotional Text 1
0x21 = Promotional Text 2
0x22 = Promotional Text 3
0x23 = Promotional Text 4
0x86 = PSI Number (Song ID)
0x87 = PSI Cut
0xE0 = Clear PDT 0x0B-0x10 = Reserved (String)
0x14-0x1F = Reserved (String)
0x80-0x85 = Reserved (String)
0x88-0x8F = Reserved (String)

Fig. 3 - PDT Frame Structure

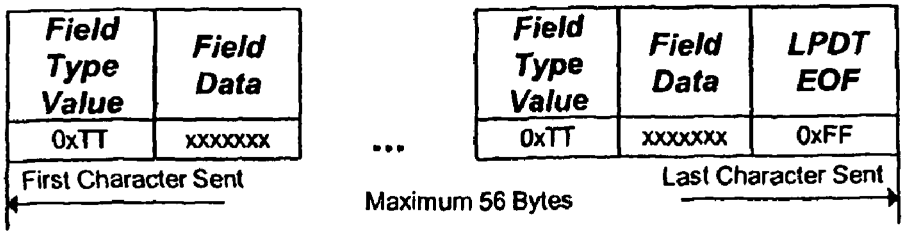

Field Type Values (0xTT):

0x0 = Reserved
0x1 = Artist
0x2 = Title
0x3 = Album
0x4 = Label
0x5 = Label ID
0x6 = Composer
0x7 = Alternate Artist
0x8 = Comments
0x9 = Category
0xA = Licensor 0x86 = PSI Number (Song ID)
0x87 = PSI Cut
0x90 = Promotional Text 1
0x91 = Promotional Text 2
0x92 = Promotional Text 3
0x93 = Promotional Text 4
0x94 = Artist and Title 0x0B-0x10 = Reserved (String)
0x14-0x1F = Reserved (String)
0x80-0x85 = Reserved (String)
0x88-0x8F = Reserved (String)

Fig. 4 - PDT Frame Format for Look-Around PDT

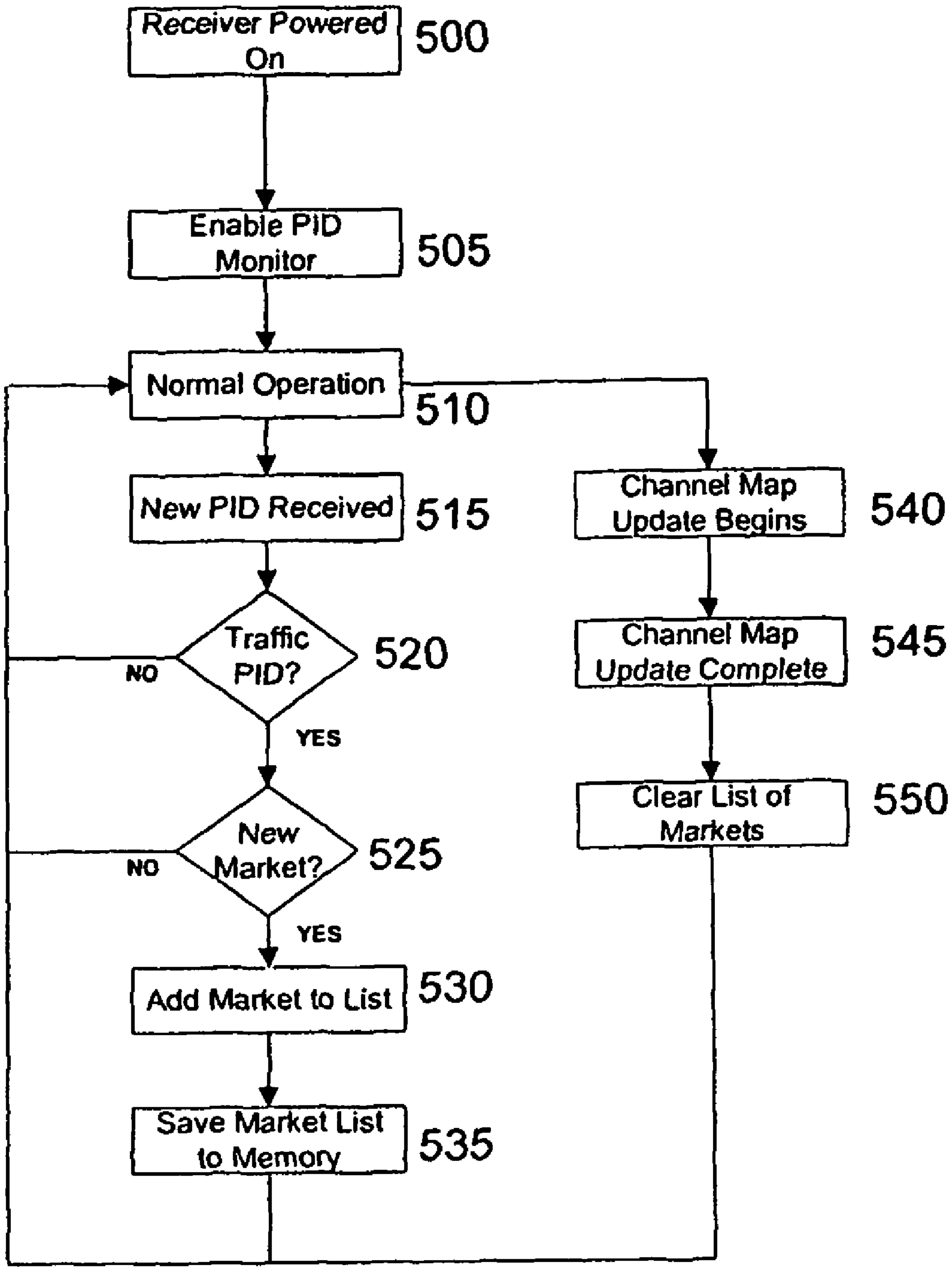
Fig. 5: Traffic Market List Building Process

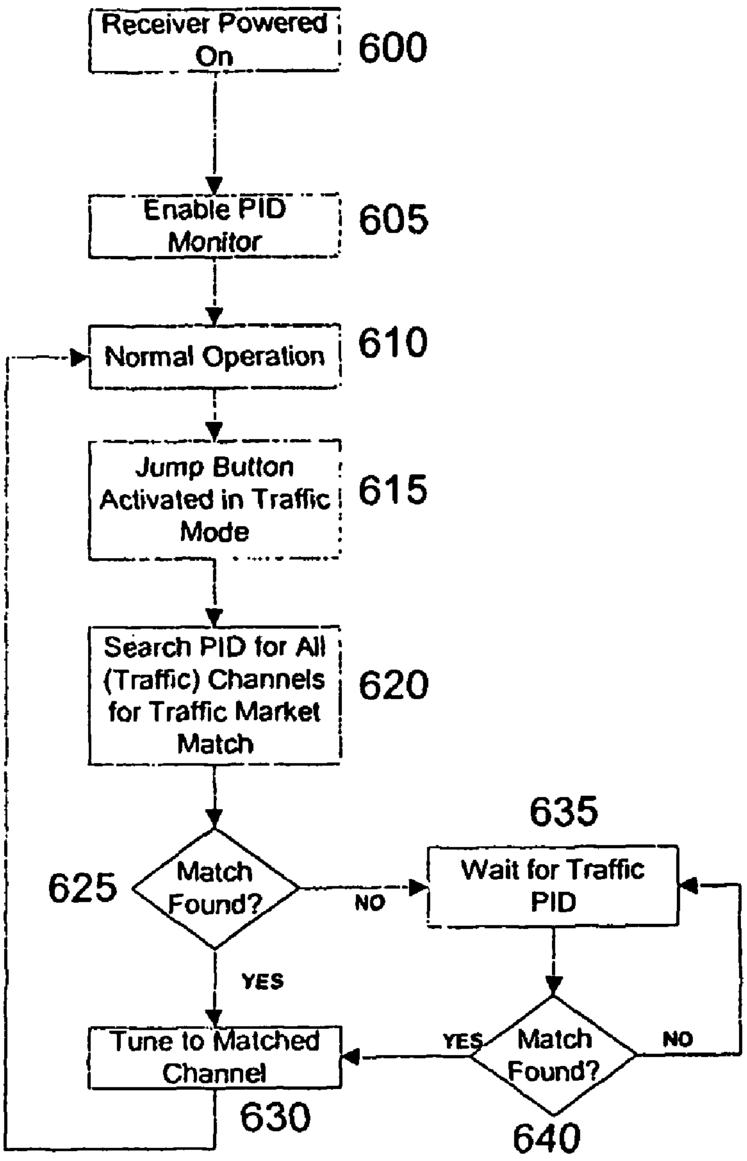
Fig. 6: Jump Button Search Process in Traffic Mode

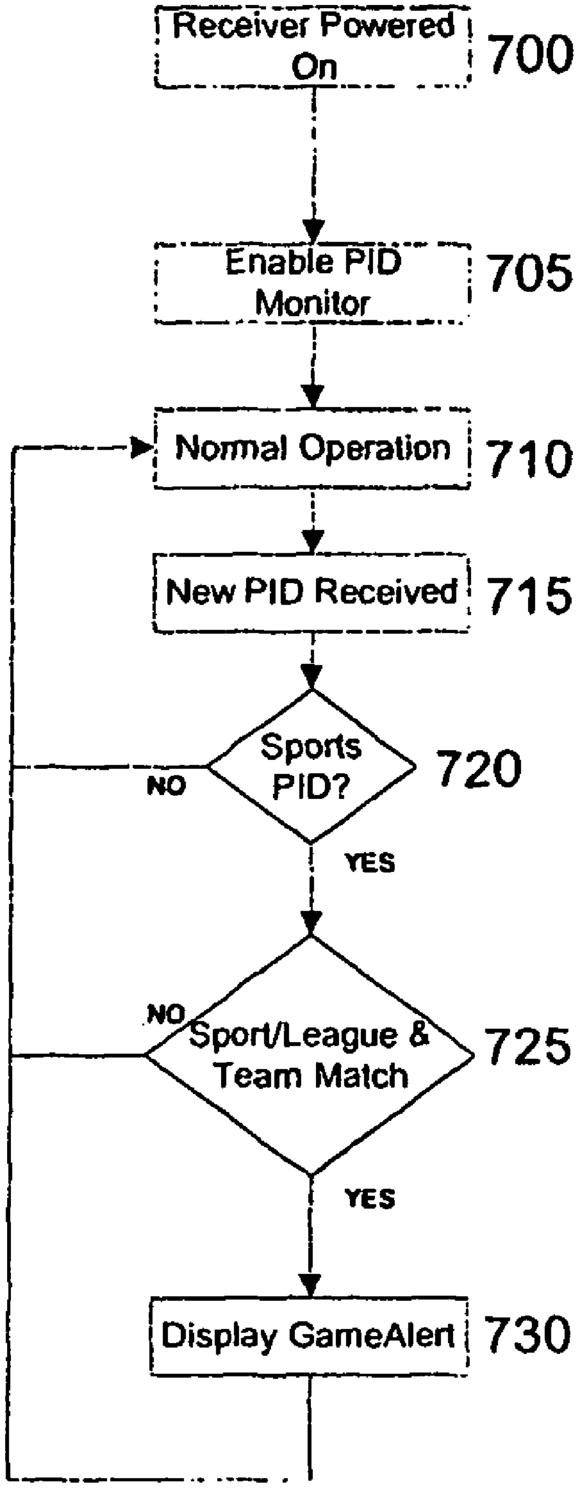
Fig. 7: GameAlert Search Process

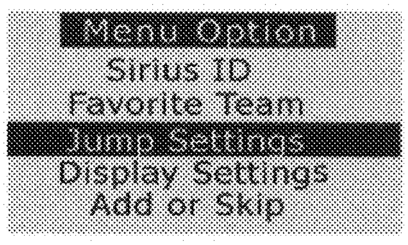
Fig. 9(a)
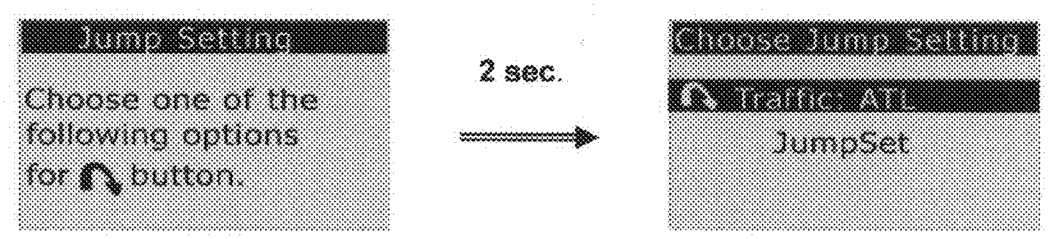
Fig. 9(b)
Fig. 9(c)

2 sec.

| *City Names* | *3-letter Abbreviations* |
|---|---|
| **Atlanta** | ATL |
| **Baltimore** | BAL |
| **Boston** | BOS |
| **Chicago** | CHI |
| **Washington DC** | DC_ |
| **Detroit** | DET |
| **Dallas/Ft. Worth** | DFW |
| **Houston** | HOU |
| **Los Angeles** | LA_ |
| **Miami** | MIA |
| **New York City** | NYC |
| **Orlando** | ORL |
| **Philadelphia** | PHL |
| **Phoenix** | PHX |
| **Pittsburgh** | PIT |
| **San Diego** | SD_ |
| **Seattle** | SEA |
| **San Francisco** | SF_ |
| **St. Louis** | STL |
| **Tampa/St. Petersburg** | TSP |

Fig. 16

| Program Type | Unique Identifier |
|---|---|
| Traffic/Weather | * |
| Sports – NFL | **@F** |
| Sports – NHL | **@H** |
| Sports – NBA | **@B** |
| Sports – MLB (NL/AL/ML) | **@M** |
| Sports – College Football | **@f** |
| Sports – College Basketball | **@b** |

Examples: for dual-broadcast games

| NFL Broadcast Team | PID |
|---|---|
| New York Giants | @FNYG |
| Detroit Lions | @FDET |
| San Francisco 49ers | @FSF_ |
| Seattle Seahawks | @FSEA |
| Dallas Cowboys | @FDAL |
| Miami Dolphins | @FMIA |

Examples: for single-broadcast games

| NFL Game (broadcast team first) | PID |
|---|---|
| New York Giants vs. Detroit Lions | @FNYGDET |
| San Francisco 49ers vs. Seattle Seahawks | @FSF_SEA |
| Dallas Cowboys vs. Miami Dolphins | @FDALMIA |
| Chicago Bears vs. Green Bay Packers | @FCHIGB_ |

Examples: for NBA/NHL games

| | |
|---|---|
| New York Knicks vs. Miami Heat | @BNY_MIA |
| Carolina Hurricanes vs. Philadelphia Flyers | @HCARPHI |

Examples: for college games

| | |
|---|---|
| Virginia Tech vs. USC | @fVT_USC |
| Wisconsin vs. Ohio | @fWISOH_ |

Fig. 17(a)

Title Field (Scores)

Play-by-Play Games

| Data | Title (max 24 characters) |
|---|---|
| NFL | NFL[space]BBB[space]XX[space]CCC[space]YY[space]II(20) |
| NHL | NHL[space]BBB[space]XX[space]CCC[space]YY[space]II(20) |
| NBA | NBA[space]BBB[space]XXX[space]CCC[space]YYY[space]II(22) |
| College Sports | BBBBB[space]XX[space]CCCCCC[space]YY[space]II(22) |

ESPN Sports Scores

| Data | Title (max 23 characters) |
|---|---|
| NL/AL/ML | N/A/ML[space]BBB[space]XX[space]CCC[space]YY[space]ZZZNNNN(23) |
| NFL | NFL[space]BBB[space]XX[space]CCC[space]YY[space]II(20) |
| NHL | NHL[space]BBB[space]XX[space]CCC[space]YY[space]II(20) |
| NBA | NBA[space]BBB[space]XXX[space]CCC[space]YYY[space]II(22) |
| College Sports | NCAAF/B[space]XX[space]CCCCCC[space]YY[space]II(22) |

NL/AL National League/American League - Major League Baseball
ML Major League Baseball (Interleague, World Series, All-Stars)
NCAAF NCAA Division I College Football
NCAAB NCAA Division I College Basketball BBB Team acronym
CCC Team acronym
XX/YY Scores
II period/quarter Number (1Q, 3P, 4Q)
ZZZ Indicator for MLB innings, either *Top* or *Bot*
NNNN Inning Number (1st, 2nd, 3rd, 4th, 5th, 6th, 7th, 8th, 9th, 10th, 11th, 12th)
OT Overtime
2OT Second Overtime Examples:

| | New York Giants vs. Detroit Lions | Nebraska vs. Pittsburgh | Yankees vs. Red Sox |
|---|---|---|---|
| Artist Field | Giants @ Lions | Nebraska @ Pittsburgh | Yankees @ Red Sox |
| Title Field | NFL NYG 10 DET 3 2Q | NCAAF NEB 20 PITT 10 4Q | ML NYY 5 BOS 4 Top4th |

Fig. 17(b)

| City | Names (PDT) | PDT ABBR | PID ABBR |
|---|---|---|---|
| Arizona | Cardinals | ARZ | ARI |
| Atlanta | Falcons | ATL | |
| Baltimore | Ravens | BLT | BAL |
| Buffalo | Bills | BUF | |
| Carolina | Panthers | CAR | |
| Chicago | Bears | CHI | |
| Cincinnati | Bengals | CIN | |
| Cleveland | Browns | CLV | CLE |
| Dallas | Cowboys | DAL | |
| Denver | Broncos | DEN | |
| Detroit | Lions | DET | |
| Green Bay | Packers | GB | |
| Houston | Texans | HST | HOU |
| Indianapolis | Colts | IND | |
| Jacksonville | Jaguars | JAX | JAC |
| Kansa City | Chiefs | KC | |
| Miami | Dolphins | MIA | |
| Minnesota | Vikings | MIN | |
| New England | Patriots | NE | |
| New Orleans | Saints | NO | |
| New York | Jets | NYJ | |
| New York | Giants | NYG | |
| Oakland | Raiders | OAK | |
| Philadelphia | Eagles | PHI | |
| Pittsburgh | Steelers | PIT | |
| San Diego | Chargers | SD | |
| San Francisco | 49ers | SF | |
| Seattle | Seahawks | SEA | |
| St. Louis | Rams | SL | STL |
| Tampa Bay | Buccaneers | TB | |
| Tennessee | Titans | TEN | |
| Washington | Redskins | WAS | |

Fig. 18

| City | Names (PDT | PDT ABBR |
|---|---|---|
| Anaheim | Might Ducks | ANA |
| Atlanta | Thrashers | ATL |
| Boston | Bruins | BOS |
| Buffalo | Sabres | BUF |
| Calgary | Flames | CGY |
| Carolina | Hurricanes | CAR |
| Chicago | Blackhawks | CHI |
| Colorado | Avalanche | COL |
| Columbus | Blue Jackets | CLB |
| Dallas | Stars | DAL |
| Detroit | Red Wings | DET |
| Edmonton | Oilers | EDM |
| Florida | Panthers | FLA |
| Los Angeles | Kings | LA |
| Minnesota | Wild | MIN |
| Montreal | Canadiens | MON |
| Nashville | Predators | NSH |
| New Jersey | Devils | NJ |
| New York | Islanders | NYI |
| New York | Rangers | NYR |
| Ottawa | Senators | OTT |
| Philadelphia | Flyers | PHI |
| Phoenix | Coyotes | PHO |
| Pittsburgh | Penguins | PIT |
| San Jose | Sharks | SJ |
| St. Louis | Blues | STL |
| Tampa Bay | Lightning | TB |
| Toronto | Maple Leafs | TOR |
| Vancouver | Canucks | VAN |
| Washington | Capitals | WAS |

Fig. 19

| League | City | Names | PID ABBR |
|---|---|---|---|
| NBA | Atlanta | Hawks | ATL |
| NBA | Boston | Celtics | BOS |
| NBA | Charlotte | Bobcats | CHA |
| NBA | Chicago | Bulls | CHI |
| NBA | Cleveland | Cavaliers | CLE |
| NBA | Dallas | Mavericks | DAL |
| NBA | Denver | Nuggets | DEN |
| NBA | Detroit | Pistons | DET |
| NBA | Golden State | Warriors | GS |
| NBA | Houston | Rockets | HOU |
| NBA | Indiana | Pacers | IND |
| NBA | Los Angeles | Clippers | LAC |
| NBA | Los Angeles | Lakers | LAL |
| NBA | Memphis | Grizzlies | MEM |
| NBA | Miami | Heat | MIA |
| NBA | Milwaukee | Bucks | MIL |
| NBA | Minnesota | Timberwolves | MIN |
| NBA | New Jersey | Nets | NJ |
| NBA | New Orleans | Hornets | NO |
| NBA | New York | Knicks | NY |
| NBA | Orlando | Magic | ORL |
| NBA | Philadelphia | 76ers | PHI |
| NBA | Phoenix | Suns | PHO |
| NBA | Portland | Trail Blazers | POR |
| NBA | Sacramento | Kings | SAC |
| NBA | San Antonio | Spurs | SA |
| NBA | Seattle | SuperSonics | SEA |
| NBA | Toronto | Raptors | TOR |
| NBA | Utah | Jazz | UTH |
| NBA | Washington | Wizards | WAS |

Fig. 20

| University/College | Names (PDT) | PDT ABBR | PID ABBR | University/College | Names (PDT) | PDT ABBR | PID ABBR |
|---|---|---|---|---|---|---|---|
| Air Force | Air Force | AF | | New Mexico | New Mexico | NM | |
| Akron | Akron | AKR | | New Mexico State | New Mexio St | NMST | NMS |
| Alabama | Alabama | ALA | | North Carolina | UNC | UNC | |
| Arizona | Arizona | AZ | | North Carolina State | NC St | NCST | NCS |
| Arizona State | Arizona St | AZST | AZS | North Texas | N Texas | NTX | |
| Arkansas | Arkansas | ARK | | Northern Illinois | N Illinois | NIU | |
| Arkansas State | Arkansas St | ARKST | ARS | Northwestern | Northwestern | NW | |
| Army | Army | ARMY | ARM | Notre Dame | Notre Dame | ND | |
| Auburn | Auburn | AUB | | Ohio | Ohio | OHIO | OH |
| Ball State | Ball St | BSU | | Ohio State | OSU | OSU | OSU |
| Baylor | Baylor | BAY | | Oklahoma | Oklahoma | OKL | |
| Boise State | Boise St | BOIST | BOI | Oklahoma State | Oklahoma St | OKST | OKS |
| Boston College | BC | BC | | Ole Miss | Ole Miss | OMU | |
| Bowling Green | BGU | BGU | | Oregon | Oregon | ORE | |
| Brigham Young | BYU | BYU | | Oregon State | Oregon St | ORST | ORS |
| Buffalo | Buffalo | BUF | | Penn State | Penn St | PSU | |
| California | California | CAL | | Pittsburgh | Pittsburgh | PITT | PIT |
| Central Michigan | C Michigan | CMU | | Purdue | Purdue | PUR | |
| Cincinnati | Cincinnati | CIN | | Rice | Rice | RICE | RIC |
| Clemson | Clemson | CLEM | CLE | Rutgers | Rutgers | RUT | |
| Colorado | Colorado | COL | | San Diego State | San Diego St | SDSU | SDS |
| Colorado State | Colo St | COST | COS | San Jose State | San Jose St | SJSU | SJS |
| Connecticut | Uconn | CONN | CON | South Carolina | S Carolina | SCAR | SC |
| Duke | Duke | DUKE | DUK | South Florida | S Florida | USF | |
| East Carolina | E Carolina | ECU | | Southern Methodist University | S Methodist | SMU | |
| Eastern Michigan | E Michigan | EMU | | Southern Mississippi | S Mississippi | SMS | |
| Florida | Florida | FLA | | Stanford | Stanford | STAN | STN |
| Florida State | Florida St | FSU | | Syracuse | Syracuse | SYR | |
| Fresno State | Fresno St | FRST | FRS | Temple | Temple | TEM | |
| Georgia | Georgia | GA | | Tennessee | Tennessee | TEN | |
| Georgia Tech | GA Tech | GT | | Texas A&M | Texas A&M | TAMU | TAM |
| Hawaii | Hawaii | HAW | | Texas | Texas | TEX | |
| Houston | Houston | HOU | | Texas Christian University | TX Christian | TCU | |
| Idaho | Idaho | IDAHO | ID | Texas Tech | Texas Tech | TXT | |
| Illinois | Illinois | ILL | | Toledo | Toledo | TOL | |
| Indiana | Indiana | IND | | Troy State | Troy St | TRYST | TRY |
| Iowa | Iowa | IOWA | IA | Tulane | Tulane | TULANE | TU |
| Iowa State | Iowa St | ISU | | Tulsa | Tulsa | TULSA | TUL |
| Kansas | Kansas | KAN | | University of Central Florida | UCF | UCF | |
| Kansas State | Kansas St | KSU | | University of Alabama at Birmingham | UAB | UAB | |
| Kent State | Kent St | KENT | KST | University of California-Los Angeles | UCLA | UCLA | UCL |
| Kentucky | Kentucky | KY | | University of Louisiana at Lafayette | LA Lafayetter | LALAF | LAL |
| Louisiana State University | LSU | LSU | | University of Louisiana at Monroe | LA Monroe | LAMON | LAM |
| Louisiana Tech | LA Tech | LAT | | University of Nevada-Las Vegas | UNLV | UNLV | UNV |
| Louisville | Louisville | LOU | | University of Texas at El Paso | UTEP | UTEP | UTE |
| Marshall | Marshall | MAR | | University of Southern California | USC | USC | |
| Maryland | Maryland | MD | | Utah | Utah | UTAH | UT |
| Memphis | Memphis | MEM | | Utah State | Utah St | UTST | UTS |
| Miami (FL) | Miami(FL) | MIAFL | MIA | Vanderbilt | Vanderbilt | VAND | VAN |
| Miami (OH) | Miami(OH) | MIAOH | MU | Virginia | Virginia | VA | |
| Michigan | Michigan | MICH | MI | Virginia Tech | Virginia Tech | VT | |
| Michigan State | Mich St | MICHST | MST | Wake Forest | Wake Forest | WF | |
| Middle Tennessee State | M Tenn St | MTSU | MTS | Washington | Washington | WAS | |
| Minnesota | Minnesota | MIN | | Washington State | Washington St | WSU | |
| Mississippi State | Miss St | MISST | MSS | West Virgina | West Virginia | WVU | |
| Missouri | Missouri | MO | | Western Michigan | W Michigan | WMU | |
| Navy | Navy | NAVY | NAV | Wisconsin | Wisconsin | WIS | |
| Nebraska | Nebraska | NEB | | Wyoming | Wyoming | WYO | |
| Nevada | Nevada | NEV | | Western Carolina | W Carolina | WCAR | WC |

Fig. 21

| MSG_ID (3 bits) | SEQ_ID (2 bits) | PAYLOAD_TYPE (3 bits) | RSVD (1 bit) | DOSC_ID (7 bits) | SEQ_NUM (0 or 8 bits) | PAYLOAD (N*8 bits) |
|---|---|---|---|---|---|---|

Total Length= N+3 bytes if SEQ_ID=0, 1, or 2
N+2 bytes if SEQ_ID=3

MSG_ID - "101" to indicate Data Descriptor Message

SEQ_ID - Sequence ID, defined as follows:
0 = Intermediate message in message sequence
1 = First message in message sequence
2 = Last message in message sequence
3 = Message is only message in message sequence PAYLOAD_TYPE - Type of PAYLOAD, defined as follows:
0 = Uncompressed
1 = Compressed using RHC algorithm
2 = Compressed using Stock Ticker Price algorithm
3 = Compressed using Update Table algorithm
4-7 = Reserved RSVD - Resevd for future use DOSC_ID - Type of DOSC data SEQ_NUM - Sequence number which is modulo-256 (only present when SEQ_ID != 3)

PAYLOAD - Contains N bytes of data in the format specified by PAYLOAD_TYPE

Fig. 22

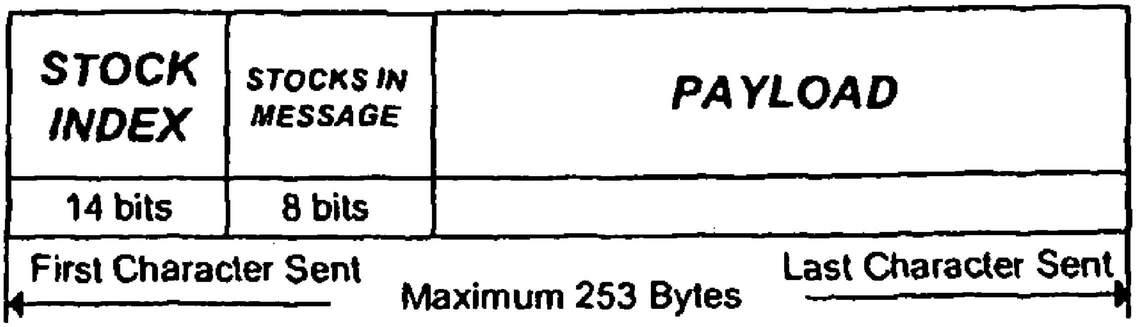
Fig. 23- Payload Format

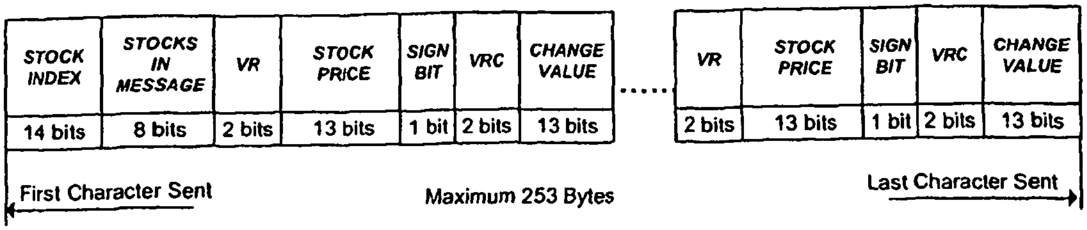
Fig. 24-Typical Payload Message
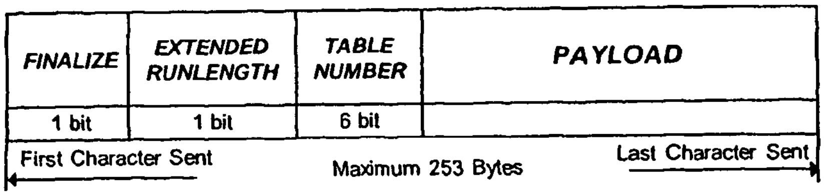
Fig. 25- Update Symbol Table Message
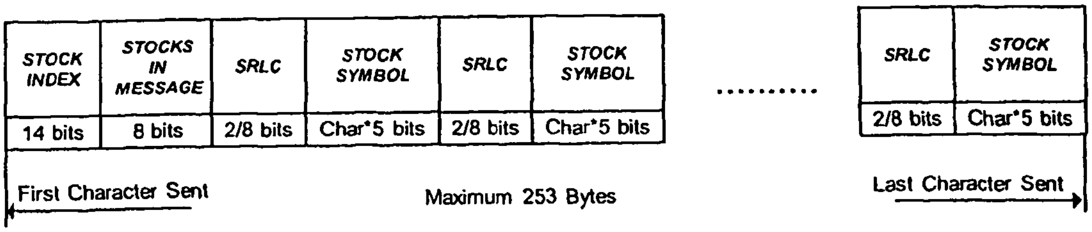
Fig. 26- Typical Update Symbol Table Message

PROGRAM AND DATA ALERTS AND AUXILIARY DATASTREAMS IN A MULTICHANNEL BROADCAST SYSTEM

CROSS REFERENCE TO OTHER APPLICATIONS

This application is the United States national stage filing of corresponding international application number PCT/US2005/000628 filed Jan. 6, 2005, which claims the benefit of U.S. Provisional Application No. 60/534,751, filed on Jan. 6, 2004, the disclosure of which is incorporated herein by reference.

TECHNICAL FIELD

The present invention relates to multichannel broadcast systems, and more particularly to providing a user of a multichannel broadcast system with program and/or data alerts regarding information available on other channels within the multichannel broadcast system as well as with auxiliary datastreams which may be of interest to the user.

BACKGROUND INFORMATION

With the rise of terrestrial satellite technology, there are now available a number of digital satellite radio services which beam hundreds of channels of programming to subscribers in automobiles, boats, and other land-based locations. Consumers enjoy the signal clarity of such multichannel broadcast systems, as well as the convenience of not having to listen to commercials, as these services are generally based on a commercial-free and subscriber fee business model. Although there are a large variety of programming channels available, subscribers tend to listen to at most a few channels, and generally, one channel most of the time. Nonetheless, since there is some content crossover between channels, as well as the fact that many users have multiple interests across a wide-ranging variety of musical and other channel content genres, it is quite likely that while a particular consumer is listening to one channel, the content of other channels may be of interest to him or her.

Additionally, in the world of television, media consumers have become accustomed to viewing one program in a main viewing window and simultaneously having available a text based datastream continuously running across the bottom of the screen. This is seen, for example, in major media news and sports broadcasts such as the Fox News Channel, the Bloomberg channel or ESPN. The analogous feature for satellite radio is the ability to listen to one channel while having auxiliary information, such as sports scores, last stock prices, weather alerts, etc. simultaneously available on a receiver display.

Conventionally, one way to most efficiently find programming of interest to a particular listener would be to either obtain detailed programming schedules in advance and change channels to always listen to particular channels, or to simply continually scan through the various channels as is done with television remote control devices, and keep switching until a song, artist, news or sports channel of interest is located.

Given the fact that multichannel broadcast systems, such as, for example, digital satellite radio services, can process, distribute and format the bit streams they broadcast in numerous ways, they have opportunities to provide, along with particular audio bit streams, textual and other non-audio data which may be of interest to a user.

One example for which this capability has been utilized is textual description of the audio clips being played. In such implementations, textual data can be embedded within the audio bit stream of each one of the broadcast audio channels. Such textual data is often referred to as Program Descriptive Text, or "PDT." PDT can be utilized to display information to a user which is descriptive of the audio content he or she is currently listening to. Such data can include, for example, the song name, the recording artist, the composer and other associated information. Alternatively, PDT data can be sent in a separate bitstream from the audio data in an associated service channel.

U.S. patent application Ser. No. 09/900,935, under common assignment herewith, contains a detailed description of how a receiver can search through transmitted PDT for all of the channels in a multichannel broadcasting system, whether by analyzing service channel PDT or PDT embedded within each audio channel, and determine whether any of the PDT data matches any audio selections on a user defined playlist. If such a match is found, a receiver can, based on relative user defined rankings of the audio clip currently being listened to and the newly matched audio clip, automatically tune to the channel where the matched audio selection is being played. The disclosure of U.S. patent application Ser. No. 09/900,935 is hereby fully incorporated herein by this reference.

In addition to the utility of such a feature, there are other possible choices besides using PDT to locate matches to a playlist and then either change stations or not change stations based on user defined rules. The ability of multichannel digital broadcast systems to simultaneously transmit audio as well as textual and other data can also be utilized to provide users with a variety of other desirable services. For example, listeners may wish to continue to listen to a particular channel without being switched to a given sports game of interest to them. Nonetheless, they may desire to be alerted whenever the score changes, or at least when a significant score change occurs. Or, for example, a user may wish to keep an eye on the stock market indices, or a certain number of stocks in particular, while enjoying other audio programming. Or, for example, while driving to a destination where various possible routes exist they may desire to be alerted when a traffic report is available and then, once having heard the report, be able to conveniently return to the prior channel.

Thus it would be desirable to have in the art a system and method which can efficiently provide users of multichannel broadcast systems with alternative ways to select audio content of interest on a particular channel not currently being played, as well as to provide auxiliary data streams for display in conjunction with related and unrelated audio programming.

SUMMARY OF THE INVENTION

Exemplary embodiments of the present invention provide a system and method for a user of a multichannel broadcasting service listening to a particular channel with alerts about the content currently available on other channels, which are of interest to the user. In addition, auxiliary datastreams of interest can be presented for display in conjunction with the audio transmission of a related or unrelated channel. The method includes, for example, storing criteria associated with programming or auxiliary content of interest to a user and searching for unique identifiers within the broadcast signal signifying the availability of content which meets the criteria. In exemplary embodiments of the present invention, such unique identifiers can be contained in a service channel. The method can further include alerting a user as to which channel such content of interest meeting such criteria is located on, or automatically directing a user to such channel, and for auxiliary data streams, displaying the data on a receiver display. In exemplary embodiments of the present invention, content of interest can be, for example, traffic information, sports games available on other channels, sports scores, stock or other trading instruments prices, news headlines or travel information.

BRIEF DESCRIPTION OF THE DRAWING

The patent or application file contains at least one drawing executed in color. Copies of this patent or patent application publication with color drawing(s) will be provided by the Office upon request and payment of the necessary fee.

FIG. 2 depicts an exemplary data descriptor message format according to an exemplary embodiment of the present invention;

FIG. 3 depicts an exemplary PDT frame structure according to an exemplary embodiment of the present invention;

FIG. 4 depicts an exemplary Look-Around PDT frame format according to an exemplary embodiment of the present invention;

FIG. 5 depicts an exemplary process flow for building a traffic market list according to an exemplary embodiment of the present invention;

FIG. 6 depicts an exemplary process flow for a jump button search in traffic mode according to an exemplary embodiment of the present invention;

FIG. 7 depicts an exemplary game alert process flow according to an exemplary embodiment of the present invention;

FIGS. 8-15 are exemplary screen shots illustrating operation of a jump button feature according to an exemplary embodiment of the present invention;

FIG. 16 depicts exemplary three letter city codes for use in a traffic alert function according to an exemplary embodiment of the present invention;

FIG. 17(*a*) depicts exemplary unique identifiers for sports games according to an exemplary embodiment of the present invention;

FIG. 17(*b*) depicts exemplary sports score update formats according to an exemplary embodiment of the present invention;

FIGS. 18-21 depict various exemplary team designations for use in an exemplary sports alert function according to an exemplary embodiment of the present invention; and FIGS. 22-26 illustrate data formats for an exemplary auxiliary stock price data stream according to an exemplary embodiment of the present invention.

DETAILED DESCRIPTION OF THE INVENTION

Figure 1:
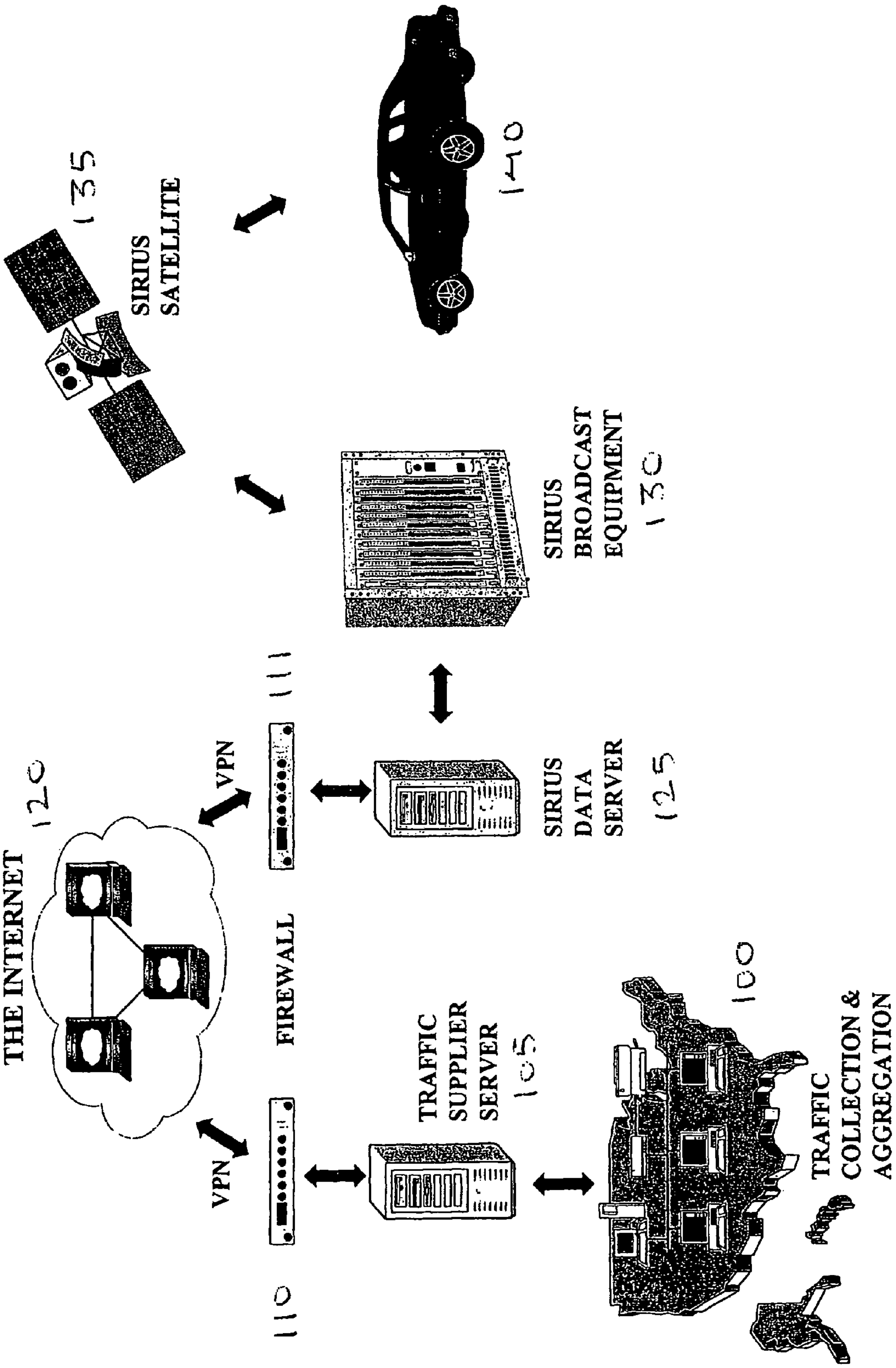
FIG. 1 depicts an exemplary traffic message acquisition and delivery system according to an exemplary embodiment of the present invention.

In exemplary embodiments of the present invention, in addition to audio channels with entertainment content, multichannel broadcasting systems can also provide users with news and other time-critical informational content. For example, if traffic information is available through a multichannel broadcast system for a variety of locales, a subscriber travelling within one or across many of such locales would like to access updates to such traffic information as they become available. Additionally, during a given trading day, a subscriber might like to be advised if one or more designated securities has gone up or down in price by a significant interval. Or, a listener may desire to be advised of the score in one or more sports games of interest.

Nonetheless, such a user may not desire to simply listen to an audio channel which does nothing but broadcast traffic information or stock market prices. Additionally, he may not want to listen to the entire broadcast of a sports game. Such a listener may prefer to listen to his favorite entertainment channels and only switch stations when those bits of information that are of interest to him become available in a financial, traffic, sports or news channel. Alternatively, he may not desire to switch at all, but rather may desire to continue to receive auxiliary information in a textual or graphic form on a receiver display.

In exemplary embodiments of the present invention, various applications in a multichannel broadcast system receiver can, for example, use flags or program identification bitstreams within a broadcast stream as unique identifiers. In such embodiments, these unique identifiers can be used to notify a user of a match to a stored favorite, such as, for example, a song, an artist, a sports team, a talk show, or of an update in auxillary broadcast information, such as, for example, traffic conditions, weather, sports scores, an advance or decline in the market price of a traded instrument, etc. In exemplary embodiments of the present invention, such flags or identifiers can be, for example, transmitted on a selectively decoded channel, such as a dedicated music, talk or data channel, or on a universally decoded channel, such as, for example, a service channel.

Favorite Song, Audio Clip or Artist

In exemplary embodiments according to the present invention a unique identifier can, for example, be associated with each song or audio clip (it is noted that the present invention is not restricted to music, but equally applies to any type of received content), or even with each recording artist, composer or talk show host. Additionally, these unique identifiers can be independent, and sent in different data fields, or they can be interconnected in a hierarchical system, such as, for example, where a particular number of bits in an identifier signifies a recording artist and another portion of the identifier signifies a particular song or audio clip. Using conventional user interface technologies a user can, for example, store in a receiver's memory a number of such favorite identifiers in appropriate data structures. Using conventional data technologies, a receiver also can then automatically search an incoming bitstream to locate matches to the stored list of identifiers.

Using such unique identifiers and such searching methods, in exemplary embodiments of the present invention a receiver application can alert users when a favorite song or artist is playing on another channel within the multichannel broadcast service. There are various methods of transmitting such unique identifiers. For example, they can be embedded within program descriptive data, as next described.

In exemplary embodiments of the present invention, an audio channel can, for example, have Program Descriptive Text ("PDT") data associated with it. The PDT data can contain information about each audio clip played on the channel, such as, for example, song title, artist name, duration of song, composer, etc. Such PDT data can also contain, for example, a field named Program ID ("PID"), which can, for example, associate a unique identifier with a particular song, and, for example, a field named Artist ID ("AID") associated with a particular recording artist or talk show personality. PDT for a given channel can be, for example, embedded in that channel's audio data, or for example, it can be transmitted globally, on one or more system service or messaging channels. Additionally, for example, PDT can be transmitted in both of these datastreams.

An advantage of transmitting PDT globally is the fact that all PDT for all channels in the system can be sent to all receivers all of the time, thus allowing them to process this data in a variety of ways. One processing possibility with a global PDT channel is continually searching for any unique identifiers according to the methods of the present invention. Such a global PDT transmission bitstream shall be referred to herein as a "Look-Around PDT" ("LAPDT") bitstream. LAPDT is so termed because it allows a receiver tuned to one channel to "look around" system-wide at the contents of all the other channels simply by processing the LAPDT bitstream.

Using LAPDT data, in exemplary embodiments of the present invention a receiver application can, for example, scan the PDT of all channels for PIDs that match those saved by the user as favorites. Once such PIDs are located, a receiver application can, for example, alert a user by generating an audible tone or message as well as by displaying a text message on a display screen. Such message can, for example, inform the user which channel the content associated with the located PID is currently playing on or is about to be played on.

As noted above, in exemplary embodiments according to the present invention, an additional PDT field called Artist ID ("AID") can analogously contain a number associated with a particular artist or group. Accordingly, the receiver can scan the LAPDT of all channels for a particular AID. As noted, in exemplary embodiments of the present invention, an AID can be a truncated PID to simplify the bit count if desired. PDT data as well as LAPDT data can be organized in a transmission data frame in a variety of formats, using known techniques.

Traffic Alert and Update

In a similar manner as described above in the context of a song or artist alert, a user can also be alerted when traffic information of interest to the user is available on a different channel. However, in a traffic message context, there are some differences from searching for a static PID associated with a given song or artist to locate content of interest which should be considered. For example, each traffic message is unique, and its value to a user is generally time dependent.

Thus, in exemplary embodiments according to the present invention, textual traffic information can be included in the PDT of a particular audio channel (such as a dedicated traffic channel) and also or alternatively in LA-PDT on a service channel. Alternatively, there can be some talk or news type channels where traffic information is provided at certain time intervals and there can be PDT associated with the traffic portions of such channels. Thus, traffic message PIDs can be, for example, transmitted in PDT and LA-PDT, with the PID value toggled for each new traffic message. It is understood that a PID in this context can refer to a unique identifier associated with a given-traffic message, as described below.

However, because each message's PID usually is different, a system may not simply want to search for a static PID as in the favorite artist or song scenario. Accordingly, various algorithms can be implemented to provide a user with automatic traffic update signals or alerts. For example, a user can store on a receiver a set of criteria to determine which types of traffic messages a user desires to be updated. In such exemplary embodiments, whenever new traffic data is received that meets this stored set, the user receives an alert. Such criteria can include, for example, city or location, type of traffic incident, severity of the traffic situation, message relating to a specific locale within a particular location, etc. Flags and/or data fields in a traffic message's PID, for example, can convey properties of the traffic message and can be used, for example, as inputs to a search algorithm.

For example, a traffic message PID can have a field for a locale, which can refer to the city, town or neighborhood which is the subject of the traffic message. Additionally, a traffic message PID can have fields for severity of incident, sublocale (such as, for example, the Ventura Freeway, Santa Barbara, Century City, North Hollywood, etc. as sublocales in the Los Angeles area), type of incident (such as, e.g. accident, congestion, weather conditions, etc.), time stamp, and any other fields that reflect sub-areas of interest or categorization. Using such a system, parsing a user's set of criteria reduces to matching one or more of the fields within the PIDs.

FIG. 1 depicts an exemplary traffic message delivery system according to an exemplary embodiment of the present invention. With reference to FIG. 1, an overall exemplary traffic system architecture is illustrated. Traffic information can be, for example, collected and aggregated at 100 for a variety of locales. In general a third party traffic content supplier can supply the traffic information to a multichannel broadcasting service. The traffic information can be uploaded to a Traffic Supplier Server 105 for transmission through ingoing firewall 110 over the Internet 120 and through outgoing firewall 111 to a Data Server 125. Data Server 125 is where, for example, the multichannel broadcasting system first receives the traffic data when a third party traffic content supplier is utilized. Data Server 125 can transmit the traffic information to the Broadcast System 130 of the multichannel broadcast system, such as is operated by assignee herein, Sirius Satellite Radio Inc. At Broadcast System 130, the traffic information can be, for example, embedded as PDT data in one or more traffic channels and also, alternatively, as LAPDT data in a service channel, as described above. As a result, the traffic information can be sent in the broadcast signal via satellite 135 to subscribers 140.

In implementing traffic data as PDT data either in connection with a traffic channel in the system, or as simply an auxiliary datastream, traffic information PIDs can be made to fit within a new or pre-existing protocol for the global transmission of PDT data. This can be useful for backwards compatibility with receivers that cannot be easily updated to process a new type of message in a service or messaging channel, which is often the case. While there are various exemplary implementations of the methods of the present invention, in many existing broadcasting systems, the most efficient and optimal implementation cannot always be accomplished due to backward compatibility concerns. The present invention, in contrast, can allow for such backwards compatibility.

Two types of implementation of program and data alerts will be described herein. These implementations include where a separate protocol of messaging is created for the data category, such as messages for traffic, trading instruments, sports, etc.; and implementations where a given message category, e.g., traffic or sports, is sent over an existing protocol designed to transfer another data type, such as, for example, LAPDT.

Additionally, two fundamental types or categories of data also are described herein. These two types include data relating to content available on other channels, such as sports scores or PID and AID information, and data which is auxiliary, and not simultaneously available on some audio channel within the system, such as, for example, stock prices. Some data also could belong to both categories, such as for example, traffic data. As an example, there could be traffic PIDs which convey information available on traffic channels, as well as more detailed traffic updates only available as a premium option (e.g., navigation information real time road condition updates, etc.) which could be provided on an auxiliary datastream.

While examples for each type of data and each type of implementation are provided, not every implementation for every possible data type is presented, it being understood that each data type could be implemented using any implementation type.

Other Applications

The following applications are similar to the traffic message context in that they involve informational content that is dynamic, and can be better tracked using dynamic PIDs. Thus, in exemplary embodiments of the present invention, a user can nonetheless be alerted to content of interest in a similar manner as described above in the traffic message context.

In exemplary embodiments of the present invention, a user could be updated whenever new sports score data is received that satisfies a specific set of criteria (such as, for example, team, league, opponent, last score was within or out of a certain point spread, etc.) which can be specified by a user. Flags and/or data fields in the transmitted sports score information can be concatenated into or otherwise included in a Sports Score ID ("SSID") for example, and can convey properties of the sports score message which can be used as inputs to a search algorithm.

In exemplary embodiments according to the present invention, a user also could be updated whenever new weather data is received that meets a specific set of criteria (such as, for example, city/location, advisories/severity, etc.). Flags and/or unique identifier fields in the transmitted weather information can convey properties of the weather message which can be used as inputs to a search algorithm.

In exemplary embodiments according to the present invention, a user also could be updated whenever new price data for a given security or commodity ("financial messages") is received that meets a specific set of criteria (such as, for example, ticker symbol, index, highest gain, highest volume, significant rise or fall, etc.). Flags and/or unique identifiers in the transmitted securities or commodity information could convey properties of the financial message and thus be inputs to a search algorithm.

Game Alert and Virtual Categories

In exemplary embodiments of the present invention, a user could be alerted when a sports game of interest to him is available on another channel. In one exemplary embodiment of the present invention, a separate data message protocol can be used to send this information on a global service channel. In another exemplary embodiment, this data can be fit into an existing protocol for sending LAPDT so as to facilitate backwards compatibility. This latter example is next described.

As noted, a PID PDT field in an LAPDT protocol in a service channel can be used to transmit traffic data, sports play-by-play games, and other specialized content. Such a PID PDT field can be used to support a song-seek feature as described in U.S. patent application Ser. No. 09/900,935 (the '935 application").

Adapting LAPDT

FIG. 2 depicts an exemplary messaging protocol for a service channel, called a Data Descriptor Message, with fields defined as shown. This message represents, for example, a standard format for sending information globally in a service channel. In this exemplary protocol, there can be a SEQ_ID field that indicates whether the PAYLOAD (e.g., content) contained in the message is (i) self-contained (SEQ_ID=3), (ii) the first in a sequence of messages (SEQ_ID=1), (iii) the intermediate in a sequence of messages (SEQ_ID=0), or (iv) the last in a sequence of messages (SEQ_ID=2). In this exemplary protocol, there is only one multi-message sequence at any one time. For example, if a sequence is started with SEQ_ID=1 and another SEQ_ID=1 is encountered before a SEQ_ID=2 is encountered, the first sequence would be deemed invalid and discarded. However, a SEQ_ID=3 message can arrive at any time, even during a multi-message sequence.

A PAYLOAD_TYPE field indicates the format of PAYLOAD. For example, If PAYLOAD_TYPE equals 0, the data is uncompressed. If PAYLOAD_TYPE=1, the data can be compressed using a known compression algorithm such as RHC compression. To support many different types of data, a DOSC_ID field can be used to indicate the type of data contained in the PAYLOAD field of the Data Descriptor Message. For example, if DOSC_ID is 0, the message can carry LAPDT, and if DOSC_ID is 1 the message can carry time and date data for receiver synchronization.

The SEQ_NUM field contains, for example, a modulo-256 sequence number used to track messages requiring multiple payloads. The SEQ_NUM shall only be incremented when SEQ_ID is not equal to 3. The SEQ_NUM field is not reset for each message sequence to allow the receiver to easily distinguish between messages in a particular sequence and from sequence to sequence. For example, for a three message sequence with SEQ_NUM values of 255, 0, and 1, the next four message sequence would have SEQ_NUM values of 2, 3, 4, and 5.

The PAYLOAD field contains the actual data payload. The format of the PAYLOAD field is dependent on the value of DOSC_ID.

For Look-Around PDT, a message sequence length is generally one message (e.g. SEQ_ID=3). For Look-Around PDT, the PAYLOAD_FORMAT field of the Data Descriptor Message can be set to 0 (uncompressed) or 1 (compressed). If PAYLOAD_FORMAT=1, the PAYLOAD field contained in the Data Descriptor Message must be uncompressed before processing.

FIG. 3 depicts an exemplary format for a PDT frame in an audio channel (e.g., not PDT in a service channel).

An exemplary uncompressed payload for Look-Around PDT is shown in Table A below. The payload consists of, for example, an array of PDT for N channels, each of which contains a channel number and a PDT Frame. This PDT Frame is modified from that shown in FIG. 3 to that shown in FIG. 4 to optimize bandwidth in the service channel.

TABLE A

Payload for Look-Around PDT (DOSC_ID = 0)

| Fields | Bytes | Description |
|---|---|---|
| Channel Number for Array Index 0 | 1 | Channel Number (1-223) |
| PDT Frame for Array Index 0 | 56 (max.) | See Error! Reference source not found. for the format |
| Channel Number for Array Index N-1 | 1 | Channel Number (1-223) |
| PDT Frame for Array Index N-1 | 56 (max.) | See Error! Reference source not found. for the format |

FIG. 4 differs from FIG. 3 in that the BOF and EOF markers are removed and field Delimiters (0x13) are removed. This is because, for example, a receiver can use the Field Type values as a delimiter between PDT fields. At the end of the PDT Frame is a LAPDT EOF control character (0xFF). This can be used by a receiver, for example, to determine the end of the PDT Frame for each channel. The Clear PDT Field Type shall never be sent in Look-Around PDT. Field Types for Promotional Text can be mapped from 0x20-0x23 to 0x90-0x93 as shown in FIG. 4.

If Artist and Title are equal (e.g., the name of the audio content is the same as the performer, such as for a talk show named for the host), a Field Type of 0x94 can be used to indicate a field that contains both Artist and Title rather than using separate fields for Artist and Title. If a Field Type is followed immediately by another Field Type or LAPDT EOF, the Field Data for that Field Type shall be assumed to be null. This is used to clear the data for that particular Field Type. The maximum PDT Frame length in this example is 56 bytes including all Field Type Values and the LAPDT EOF. If the frame is longer than 56 bytes, the PDT frame can be truncated using the following exemplary scheme:

1. If the PDT Frame contains a Composer field, only the last name of the Composer shall be kept. The last name is found by first removing any trailing spaces from the end of the string. Then, search for the first space character from the end of the string and keeping everything after that (not including the trailing spaces removed above) as the new Composer field. If the resulting PDT frame with the truncated Composer field has a length of 56 bytes or less, no further truncation is necessary.
2. The number of Field Types shall be limited to Song ID, Title, Artist, and Composer. If the resulting PDT frame has a length of 56 bytes or less, no further truncation is necessary.
3. All fields in the PDT frame shall be truncated down to 10 bytes (includes the Field Type). Then, one byte shall be added back to each field until either the Field Data for each field is back to its original length or the total frame length equals 56 bytes.

In exemplary embodiments of the present invention a new PID format that maintains uniqueness from PIDs used for song identification and that is also backward-compatible with a song-seek feature can be defined and used within a DOS-C_ID=0, or LAPDT message type. For example, in a LAPDT protocol where a PID refers to a song ID special flag characters, for example, can be used in the PID field to indicate specialized content. Thus, for example, traffic can be uniquely identified with the "*" character in the first character position of the PID field. Sports play-by-play, for example, can be uniquely identified with the "@" character in the first character position of the PID field, and the sport or league can, for example, then be identified by a unique character in the second character position of the PID field. Professional sports can for example, use capital letters and college sports can, for example, use lower-case letters. Such a system of exemplary unique identifiers is given in Table B below:

TABLE B

| Program Type | Unique Identifier |
|---|---|
| Traffic/Weather | * (ASCII 0x2A) |
| Sports - NFL | @F (ASCII 0x40, 0x46) |
| Sports - NHL | @H (ASCII 0x40, 0x48) |
| Sports - NBA | @B (ASCII 0x40, 0x42) |
| Sports - MLB | @M (ASCII 0x40, 0x4D) |
| Sports - Soccer | @S (ASCII 0x40, 0x53) |
| Sports - Auto Racing | @A (ASCII 0x40, 0x41) |
| Sports - College Football | @f (ASCII 0x40, 0x66) |
| Sports - College Basketball (men's) | @b (ASCII 0x40, 0x62) |
| Sports - College | @c (ASCII 0x40, 0x63) |
| Sports - Other | @O (ASCII 0x40, 0x4F) |

Other specialized content, for example, can be added as may be needed by using unique identifiers in the first character position of the PID field. Characters following the unique identifier can provide more detailed information regarding the type of program being transmitted within each specialized content category.

PID Format for Traffic Markets

In exemplary embodiments of the present invention, a PID format for traffic markets can populate the PID field with the four characters: "*XXX". As noted, the first character can, for example, be "*" (an asterisk—ASCII 0x2A) and the last three characters ("XXX") can be a three-letter (all-caps) designator for the city/market (padded with an underscore character if necessary). The "*" character can thus be used to guarantee uniqueness of traffic programs. Table C below gives exemplary PIDs for some example markets supported by an exemplary mutichannel broadcasting system (_ indicates an underscore character—ASCII 0x5F):

TABLE C

| Market | PID |
|---|---|
| Atlanta | *ATL |
| Baltimore | *BAL |
| Boston | *BOS |
| Chicago | *CHI |
| Dallas/Fort Worth | *DFW |
| Detroit | *DET |
| Houston | *HOU |
| Los Angeles | *LA_ |
| Miami | *MIA |
| New York | *NYC |
| Orlando | *ORL |
| Philadelphia | *PHL |
| Phoenix | *PHX |
| Pittsburgh | *PIT |
| St. Louis | *STL |
| San Diego | *SD_ |
| San Francisco | *SF_ |
| Seattle | *SEA |
| Tampa/St. Petersburg | *TSP |
| Washington, DC | *DC_ |

Thus, for example, exemplary PIDs for a channel that alternatively carries traffic/weather broadcasts for Washington D.C. and Baltimore can have the following formats: *DC and *BAL.

Proposed PID Format for Play-by-Play Games

In exemplary embodiments of the present invention, a system may choose to broadcast play-by-play sports games on a variety of channels, not just on channels assigned to a "SPORTS" category. Such channels, for example, may carry non-sports content a majority of the time and can be assigned to other categories. Thus, it is useful to dynamically identify when play-by-play games are being broadcast on these channels and so alert users. For team sports, a system can, for example, broadcast the game on one channel choosing the broadcast feed from one of the two teams. For example, picking up the Detroit feed for a Detroit Pistons/New Jersey Nets NBA game. Or, for example, a system can broadcast the game on two channels using the broadcast feeds from both of the two teams. For example, putting the Chicago feed for the Chicago Bears/New York Giants on one channel and putting the New York feed on another channel. The following discussion gives exemplary PID formats for each of these exemplary situations.

Single Broadcast Per Game (Single Channel)

The PID format for play-by-play games for single broadcasts can be similar to the traffic PID format. The PID field is populated, for example, with eight characters: "@XYYYZZZ". The first character is "@" (at symbol—ASCII 0x40) to designate sports play-by-play, the second character "X" is the unique sport/league identifier [for example, "F" (ASCII 0x46) to designate NFL], the next three characters "YYY" are the three-letter (all-caps) designator for one of the two teams (padded with an underscore character if necessary), and the last three characters "ZZZ" are the three-letter (all-caps) designator for the other team (padded with an underscore character if necessary). The "@" character can be used to guarantee uniqueness of sports play-by-play programs. Table D below depicts an example PID for a broadcast based on a New Orleans Hornets/Indiana Pacers NBA game.

TABLE D

| Program | NBA: New Orleans/Indiana game |
|---|---|
| PID | @BNO_IND |

Two Broadcasts Per Game (Two Channels)

The PID format for play-by-play games for two broadcasts is similar to the traffic PID format. The PID field in each channel can be populated with five characters: "@XYY".

The first character is "@" (at symbol—ASCII 0x40) to designate sports play-by-play, the second character "X" is the unique sport/league identifier [for example, "F" (ASCII 0x46) to designate NFL], and the last three characters "ZZZ" are the three-letter (all-caps) designator for the team whose broadcast feed is being used (padded with an underscore character if necessary). The "@" character is used to guarantee uniqueness of sports play-by-play programs.

Table E below depicts an example PID for a broadcast based on a Detroit Lions/Kansas City Chiefs NFL game.

TABLE E

| Program | NFL: Detroit/Kansas City game | → |
|---|---|---|
| PID - CH A (Detroit Feed) | @FDET | → |
| PID - CH B (KC Feed) | @FKC__ | → |

Jump Button Feature in Traffic Mode

Figure 8:

In exemplary embodiments of the present invention, a jump button can be implemented for changing to a channel in response to an alert. An exemplary jump button is illustrated in FIG. 8 and further described below in connection with FIG. 8. This feature can allow selection of a button on the receiver to cause the desired information to be provided to the user. As an example, a jump button in traffic mode involves several steps. The first step is for the receiver to collect, for example, the traffic markets from, for example, the Sirius signal in order to build the menu pick list of traffic markets. The second step is to search the incoming PID changes for a match to the user-selected market after the Jump Button is activated in traffic mode.

The traffic market list can be purged upon a channel map update. This ensures that if the broadcast system changes the markets for which traffic information is broadcast, the receiver does not list any old/deleted markets after the change. After the channel map update is complete, the receiver searches the incoming PID changes for traffic PIDs, and adds any new markets to the list of traffic markets presented to the user. Note that since the traffic reports may be up to 4 minutes in length, and two markets may time-share a single channel, the process to collect the complete list of traffic markets broadcast by the system may take 8 minutes (or more). The market list presented to the user is simply the 3-letter market designators saved from the information broadcast within the traffic PID (trailing underscore removed prior to display). There is no it information hard-coded in the receiver. An exemplary traffic market list-building process is depicted FIG. 5, which shows reception of traffic PIDs by the receiver to dynamically build a traffic market list each time the receiver is powered up.

Upon activation of the jump button in traffic mode, the receiver can perform a PID scan of all (traffic) channels to search for the particular market's traffic report. If a match for the traffic market is found in this initial scan, the receiver automatically tunes to the channel with the match. If no match is found in the initial scan, the receiver then searches the incoming PID changes for a traffic PID and a match to the desired traffic market. Once a match is found, the receiver automatically tunes to the channel with the match. A exemplary simplified flow diagram of a traffic PID search process is depicted in FIG. 6, which shows processing by the receiver after a user reflects the jump button to search for the traffic PID associated with the jump button.

GameAlert

In exemplary embodiments of the present invention, a game alert functionality ("Game Alert") can be provided. There are two components to a GameAlert. One component is the user selection of a favorite team (NFL team/logo) in a main menu. The other is a seek operation for a saved team.

In exemplary embodiments of the present invention, for the favorite team selection, the list of 3-letter designators for each NFL team (see section on Designators for NFL Teams later in this document) can be hard coded into a receiver (associated with the team names). This can be the only information hard-coded in the receiver (e.g. no other traffic market designator or team designator information is hard-coded in the receiver.) Once the user saves a favorite team, the receiver will continuously search the incoming PID changes for an NFL play-by-play game (PID beginning with "@F") containing the three-letter designator "VVWW" for the user's favorite team. It will search both single-broadcast PIDs (PID format "@FYYYZZZ") and dual-broadcast PIDs (PID format "@FYYY") for a match (YYY=WWW or ZZZ=WWW). If a match is found, for example, a GameAlert pop-up can be displayed to a user.

The second component is the seek operation for saved teams. When the user performs a save (for example, via a press/hold MEM operation) during a sports play-by-play broadcast, the receiver can, for example, save the sport/league identifier and one of the team identifiers (if any) (pulled from the information broadcast in the sports PID) into memory (rather than the PDT). If more than one team identifier is present, the receiver will prompt the user to choose between the two teams by displaying both team's 3-letter designators (trailing underscore not displayed) and allowing the user to select one of them. In the memory recall screen, the receiver will display the league/sport and 3-letter team code (trailing underscore not displayed) rather than the PDT. (This provides for better recognition by the user.) When a seek function is enabled for the sports play-by-play entry, the receiver will continuously search the incoming PID changes for a match to the sport/league and team. (The incoming PIDs could contain one or two teams.) If a match is found a GameAlert pop-up can be displayed to the user.

An exemplary GameAlert of this search process is detailed in FIG. 7.

Virtual Categories

The virtual category feature extends the category operation of a given receiver to categories of channels built dynamically by the receiver on every power up. To enhance the user experience, more categories can be added to the category function by searching the incoming PID changes, and building "virtual" categories based on the information contained within them. A set of virtual categories can include Traffic (e.g., channels with traffic information, PID begins with "*"), NFL Zone (e.g., channels with NFL play-by-play, PID begins with "@F"), NBA Zone (e.g., channels with NBA play-by-play, PID begins with "@B"), NHL Zone (e.g., channels with NHL play-by-play, PID begins with "@H"), and Other (e.g., channels with other sports play-by-play, PID begins with "@" but not for NFL/NBA/NHL). A virtual category is only displayed if there is at least one active channel entry.

On every power up, the virtual categories can be initialized to be empty lists. The receiver should continuously monitor PID changes to manage the list of channels in each virtual category:

1. if a PID meets the criteria for one of the five virtual categories and its corresponding channel is not currently a member of that virtual category, it is added to the virtual category
2. if a PID is received for a channel that belongs to one of the five virtual categories and the PID no longer meets the criteria for that virtual category, it is deleted from the virtual category.

Both checks should be performed on every incoming PID change.

If it is determined that the above algorithm is too computationally intensive, in alternate exemplary embodiments of the present invention, a receiver can simply perform a periodic scan of PIDs for all channels and build the channel list for each of the five virtual categories from the results of the scan. If this method is chosen, the scan should be performed at least once per two minutes.

Exemplary Designators for NFL Teams

The designators provided in Table F below are hard-coded in association with the team names displayed for choosing favorite team for the Splash Screen and GameAlert features.

TABLE F

| NFL Team | Designator |
|---|---|
| Arizona Cardinals | ARI |
| Atlanta Falcons | ATL |
| Baltimore Ravens | BAL |
| Buffalo Bills | BUF |
| Carolina Panthers | CAR |
| Chicago Bears | CHI |
| Cincinnati Bengals | CIN |
| Cleveland Browns | CLE |
| Dallas Cowboys | DAL |
| Denver Broncos | DEN |
| Detroit Lions | DET |
| Green Bay Packers | GB_ |
| Houston Texans | HOU |
| Indianapolis Colts | IND |
| Jacksonville Jaguars | JAC |
| Kansas City Chiefs | KC_ |
| Miami Dolphins | MIA |
| Minnesota Vikings | MIN |
| New England Patriots | NE_ |
| New Orleans Saints | NO_ |
| New York Jets | NYJ |
| New York Giants | NYG |
| Oakland Raiders | OAK |

TABLE F-continued

| NFL Team | Designator |
|---|---|
| Philadelphia Eagles | PHI |
| Pittsburgh Steelers | PIT |
| San Diego Chargers | SD_ |
| San Francisco 49ers | SF_ |
| Seattle Seahawks | SEA |
| St. Louis Rams | STL |
| Tampa Bay Buccaneers | TB_ |
| Tennessee Titans | TEN |
| Washington Redskins | WAS |

Exemplary Designators for NBA Teams

In exemplary embodiments of the present invention the designators in Table G below can be used for NBA teams. These designators do not need to be hard coded into the receiver.

TABLE G

| NBA Team | Designator |
|---|---|
| Boston Celtics | BOS |
| Miami Heat | MIA |
| New Jersey Nets | NJ_ |
| New York Knicks | NY_ |
| Orlando Magic | ORL |
| Philadelphia 76ers | PHI |
| Washington Wizards | WAS |
| Atlanta Hawks | ATL |
| Chicago Bulls | CHI |
| Cleveland Cavaliers | CLE |
| Detroit Pistons | DET |
| Indiana Pacers | IND |
| Milwaukee Buck | MIL |
| New Orleans Hornets | NO_ |
| Toronto Raptors | TOR |
| Dallas Mavericks | DAL |
| Denver Nuggets | DEN |
| Houston Rockets | HOU |
| Memphis Grizzlies | MEM |
| Minnesota Timberwolves | MIN |
| San Antonia Spurs | SA_ |
| Utah Jazz | UTH |
| Golden State Warriors | GS_ |
| Los Angeles Clippers | LAC |
| Los Angeles Lakers | LAL |
| Phoenix Suns | PHO |
| Portland Trail Blazers | POR |
| Sacramento Kings | SAC |
| Seattle SuperSonics | SEA |
| Charlotte Bobcats | CHA |

Exemplary Designators for NHL Teams

In exemplary embodiments of the present invention the designators in Table H below can be used for NBA teams. These designators do not need to be hard coded into the receiver.

TABLE H

| NHL Team | Designator |
|---|---|
| Anaheim Mighty Ducks | ANH |
| Atlanta Thrashers | ATL |
| Boston Bruins | BOS |
| Buffalo Sabres | BUF |
| Calgary Flames | CGY |
| Carolina Hurricanes | CAR |
| Chicago Blackhawks | CHI |
| Colorado Avalanche | COL |
| Columbus Blue Jackets | CLS |
| Dallas Stars | DAL |
| Detroit Red Wings | DET |
| Edmonton Oilers | EDM |

TABLE H-continued

| NHL Team | Designator |
|---|---|
| Florida Panthers | FLA |
| Los Angeles Kings | LA__ |
| Minnesota Wild | MIN |
| Montreal Canadiens | MON |
| Nashville Predators | NSH |
| New Jersey Devils | NJ__ |
| New York Islanders | NYI |
| New York Rangers | NYR |
| Ottawa Senators | OTT |
| Philadelphia Flyers | PHI |
| Phoenix Coyotes | PHO |
| Pittsburgh Penguins | PIT |
| San Jose Sharks | SJ__ |
| St. Louis Blues | STL |
| Tampa Bay Lightning | TB__ |
| Toronto Maple Leafs | TOR |
| Vancouver Canucks | VAN |
| Washington Capitals | WAS |

Because there is an identifier for the sports league, a receiver can search and compile a list of all currently broadcasting Play-by-Play games per the sports league. Thus, in exemplary embodiments of the present invention, the content for any virtual category can be located on any channel in the broadcasting system and linked by the identifier used for the virtual category.

In exemplary embodiments there can also be, for example, any number of virtual categories such as the following:

TRAFFIC
NFL ZONE
NBA ZONE
NHL ZONE
MORE SPORTS
COLLEGE FOOTBALL
COLLEGE BASKETBALL
MORE COLLEGE SPORTS
MY GAME ZONE

In exemplary embodiments of the present invention, receiver functionality while in any of the virtual categories can be the same as regular categories. A virtual category is only displayed if there is at least one match in the virtual category.

"More Sports" can include all professional sports Play-by-Play games that do not belong in NFL, NBA or NHL. It can include, for example, games played on ESPN Radio for MLB, racing, etc. "More College Sports" can include other collegiate games such as baseball, lacrosse, volleyball, etc.

"My Game Zone" can, for example, include play-by-play games by the teams the user has selected for "Game Alert" teams as well as all the teams saved for seek entries. For example, by pressing a display button on the receiver a user can toggle the team names with current scores and game status (e.g., 1 for first quarter, first period, OT for Overtime).

FIG. 17(*a*) depicts an exemplary hierarchical system for unique identifiers for sports PIDs which can be implemented in LAPDT messages (by using the PIDs depicted in FIG. 17(*a*) as the PID field of a LAPDT message, such as for example, the "Song ID" field of FIG. 4). In the depicted system, all sports share a unique first character "@" and each sport has a unique identifier in the second character spot. For dual broadcast games, the next three characters are a city/team designation representing the audio feed from that city (e.g., the "home" team audio play by play), and for single broadcast games both cities/teams involved are encoded, as shown, resulting in use of all eight characters.

FIG. 17(*b*) depicts exemplary formats for displaying sports scores on a receiver screen in exemplary embodiments of the present invention, and a key explaining the terms used in the exemplary formats. Thus, as noted a user may not want to tune to the channel broadcasting the game, but nonetheless may want to keep on top of the score. In an exemplary embodiment of the present invention, these formats can also be implemented as part of a LAPDT message, using the Artist and Title fields (0x1 and 0x2 in FIG. 4, respectively) of an LAPDT message. This facilitates backward compatibility, as noted.

Alternatively, a separate (e.g., new) data message type (similar to the stock ticker message types described below) can be defined for sports scores. Such a message format would not be forced to fit in to LAPDT data fields, and could be a sports scores DOSC ID message type, and can have an exemplary payload defined, for example, with the following fields: league identifier, team1 identifier, team1 score, team2 identifier, team2 score, period/quarter/inning identifier. It may be useful to include a date for the game as well to be able to send/distinguish games for multiple dates. The team identifier could simply be an ASCII string or it could be an index into a table of ASCII strings. The table could either be a static table (included in the receiver at production) or a dynamic table with provision for over-the-air updates (e.g., through another DOSC_ID message as an example—as described in the stock ticker description below). The appropriate bit widths of each field would be chosen to (a) accommodate the maximum number of combinations contemplated for each field (with some room for future expansion) and (b) optimize bandwidth efficiency.

FIGS. 18-21 depict exemplary designations which can be used in exemplary embodiments of the present invention. The city codes can be obtained by monitoring and acquiring PIDs, and not hard coding the following names. These names are current available city markets and may or may not be future markets for the multi-channel broadcasting system. For city abbreviations that only contain 2 letters, a space can be added before broadcasting to maintain consistency. FIG. 18 is an exemplary NFL-team list, FIG. 19 an exemplary NHL list, FIG. 20 an exemplary NBA list, and finally, FIG. 21, an exemplary list for use with college sports scores.

II. Jump Button

In exemplary embodiments according to the present invention, a feature can be provided that allows a user to easily tune to the traffic/weather information for his city of interest, and then tune back to the music/talk/sports programming he was previously listening to. This can be implemented, for example, by a jump button. A jump button is a unique preset button that allows a user to tune to one specific channel and tune back to previous channel with the minimum amount of user interaction.

In exemplary embodiments of the present invention to achieve a simple user interface, an extra button can be created to serve as the Jump button. An exemplary jump button is shown in FIG. 8 at the bottom of a receiver user interface.

Menu Options

There can, for example, be a Menu Option on the receiver display named "Jump Settings" in a main Menu Options tree, as shown in FIG. 9(*a*). Once a user presses the Select button to enter the "Jump Setting" screen, a display, such as is depicted in FIG. 9(*b*) can, for example, appear for 2 seconds providing directions for the user's selection and then show two options for the user as shown in FIG. 9(*c*): Traffic: XXX and JumpSet, where XXX is the 3-letter abbreviation of a city where traffic/weather report is available (the exemplary screen depicted in FIG. 9(*c*) shows “ATL” for Atlanta). The highlight bar, as well as the Jump button icon should be on the current user selection.

In exemplary embodiments of the present invention a Jump button can be programmed to function as one of the two options given above, but not both. In such embodiments the Jump button icon shall always appear to the left of the user selected Jump button function.

Traffic

Figure 10A:
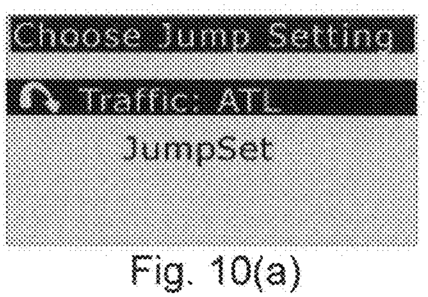
Figure 10B:
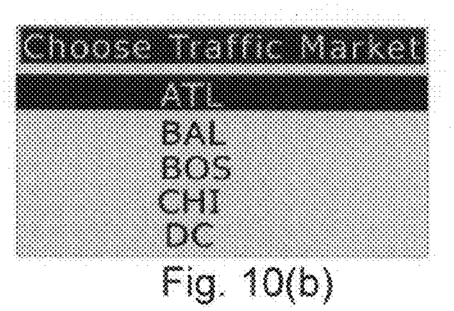
Figure 10C:
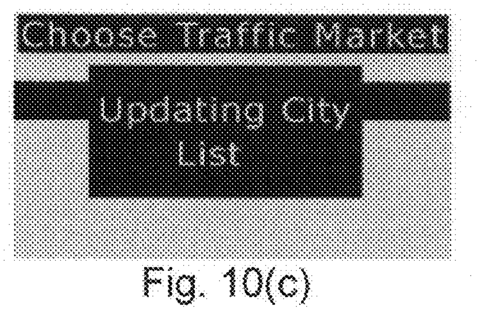

By scrolling the highlight bar to “Traffic:XXX”, as shown in FIG. 10(*a*) and pressing and releasing, for example, a Select button, a user is moved one layer deeper into the city selection menu. Here, as shown in FIG. 10(*b*), for example, a top line can display “Choose Traffic Market” with all the then system-available city listings, in their three-letter abbreviation form, in alphabetical order. The highlight bar defaults to the current city selection. Controlling the receiver interface, such as by rotating the encoder knob or pressing the CH+/CH− button, scrolls through the city list and each city is highlighted for selection. The user can press the Select button while the city choice is highlighted to confirm a selection. The city ID is then saved for the Jump feature. If the user chooses to cancel the action without making a selection (by pressing MENU to return to main menu), the previous city ID selection is retained.

Since the city market’s 3-letter abbreviation is collected through monitoring and collecting from PDT after each system global control information update, there will be instances when the user intends to make a city selection before all the city markets are available. In the case where no city IDs have been collected, a pop-up can, for example, appear indicating “Updating City List” for 2 seconds as shown in FIG. 10(*c*) and then returning the user to the previous menu option. Upon a channel update from broadcast, a new city list can be rebuilt. The city list can be saved to memory and can thus be available at next power-up, until the next channel update.

Jump Set

Figures 11A, 11B, 11C:
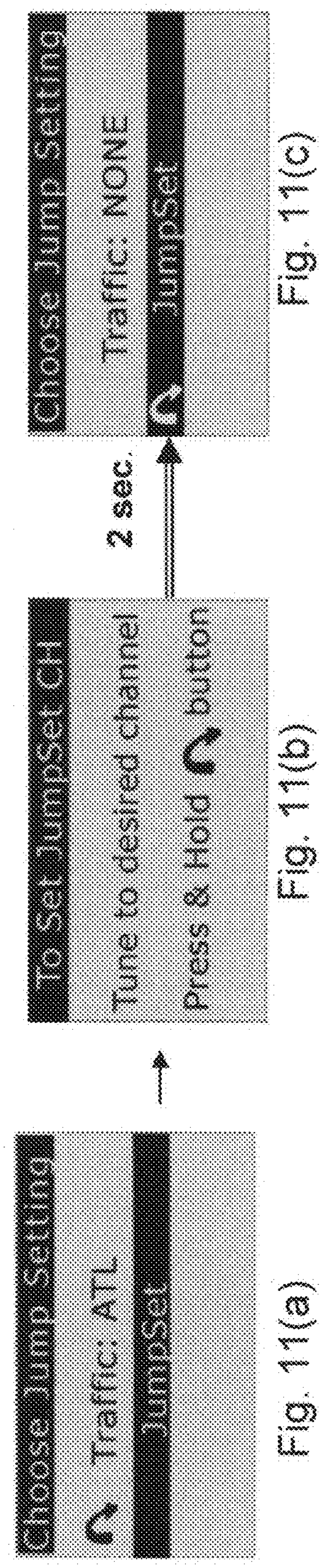

In exemplary embodiments of the present invention, scrolling the highlight bar to “Traffic:XXX” and pressing and releasing the Select button confirms that the Jump button will be used for JumpSet function. The display can appear, for example for 2 seconds, providing directions to set the JumpSet channel, before returning to the “Choose Jump Setting” screen. The Jump button icon shall appear next to “JumpSet” instead of the “Traffic:XXX”. This sequence is depicted in FIGS. 11(*a*)-(*c*).

Initial Activation

Figure 12A:
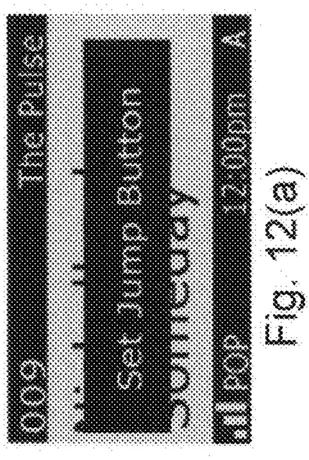
Figure 12B:
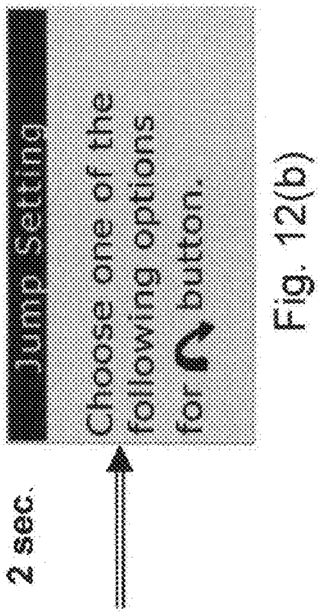
Figure 12C:
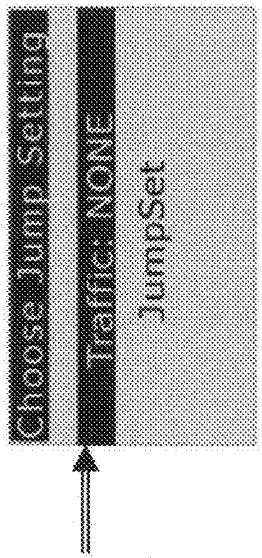

When the Jump Button is pressed or pressed and held for the very first time (e.g., at first use or factory reset), a pop-up can appear indicating “Set Jump Button” for 2 seconds, before taking the user to the “Jump Setting” screen of Menu Options. A user can then follow the steps described above to choose Jump button functionality. This functionality is illustrated in FIGS. 12(*a*)-(*c*). The Jump button icon usually will not appear next to either option until the user makes a selection, as seen in FIG. 12(*c*). If a user exits without making a selection, the “Initial Activation” state should apply until a selection is made.

Tuning and Alert

While listening to any audio programming, a press and release of the Jump button or a press and hold of the Jump Button can activate the Jump button functionality. If it is determined that this is the first time the Jump button is activated, then the Initial Activation description applies. Otherwise, the receiver can recognize whether the Jump button has been set to city traffic report or simply as a JumpSet button.

Traffic/City Market

Figures 13A, 13B, 13C, 13D, 13E:
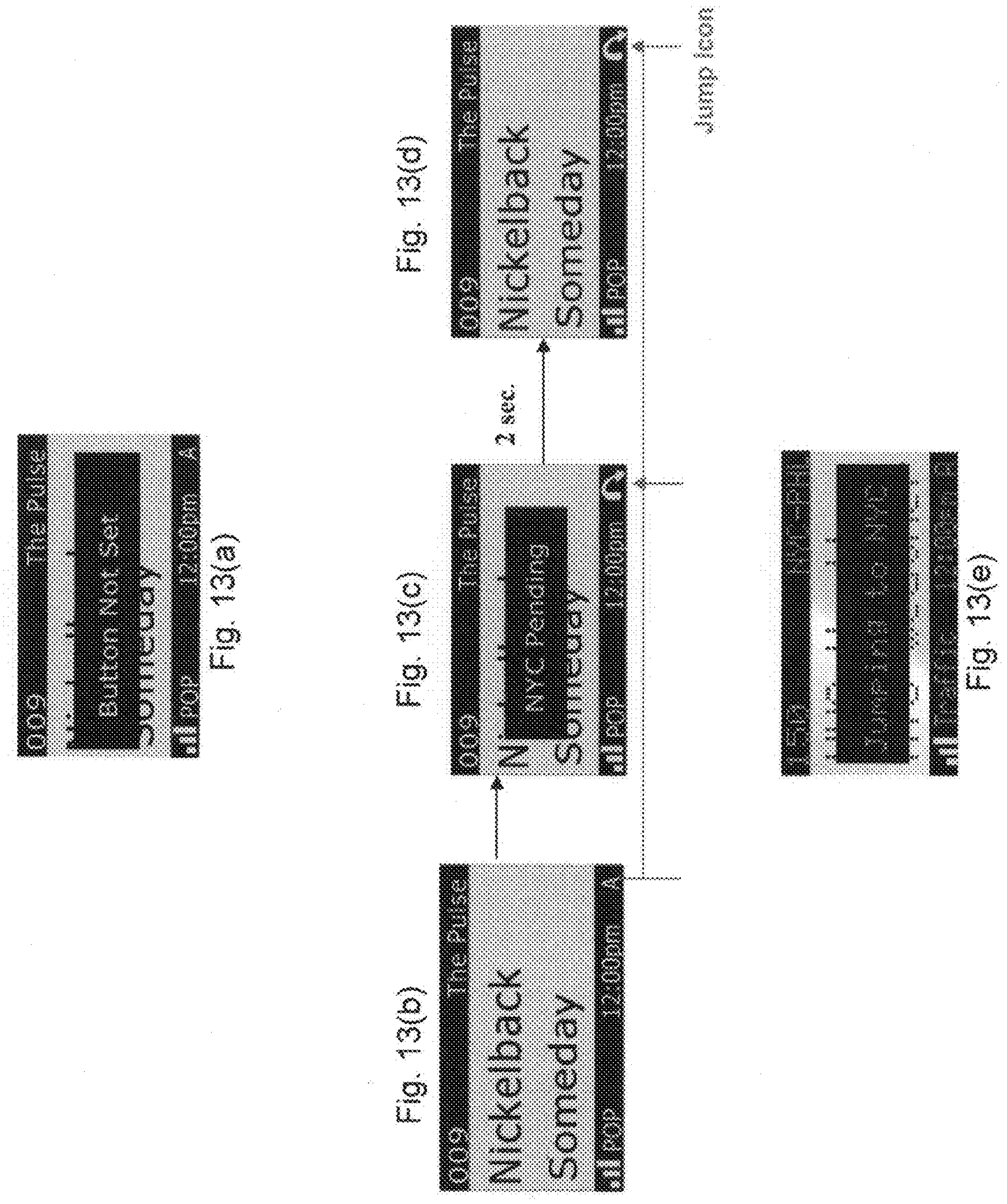

Once it is determined that the Jump button is set to Traffic (City Market), the receiver can, for example, detect whether a City ID has been set. If no city ID has been selected, e.g. a user backs out of the initial activation screen without setting a city, a pop-up can, for example, appear indicating “Button Not Set” as shown in FIG. 13(*a*).

In the case that a city ID is set, the receiver should immediately start scanning all channels for a matching City ID in the PID field. FIG. 13(*b*) shows an exemplary user interface at the beginning of such a search, where the current channel, artist and song are displayed. While searching for the city ID, a pop-up appears, with “XXX Pending”, where XXX is the 3-letter abbreviation of the city name, for 2 seconds specifying that the receiver is indeed searching and waiting for the desired traffic/weather report. This is shown, for example, in the exemplary screen shot of FIG. 13(*c*). The band indicator on the bottom right of the display thus changes to the Jump button icon to signify that the receiver is in a searching mode, as shown in FIG. 13(*d*). The Jump button icon can, for example, alternate ON and OFF every 1 second while the search is active. In exemplary embodiments of the present invention, pressing the Jump button again during the search cancels the search and returns to normal operation mode and the Jump button icon is reset.

The receiver continues searching until a match is found or the user enters any list mode (Channel list, category list, & Menu Option) prior to a found match. When it exits any of the list mode and return to the normal operation mode, the city ID search resumes. Once a match is found, a pop-up can be displayed for 1 second indicating “Jumping to, XXX”, where XXX is the 3-letter abbreviation of the city name, as shown, for example, for New York City, in FIG. 29(*e*).

In exemplary embodiments of the present invention, a receiver can at this point tune to the desired traffic channel immediately and sound a confirmatory audible beep. The Jump button icon is then reset. Prior to any subsequent tuning to channels, if the user presses the Jump button again, the receiver tunes to the previous channel. If no previous channel is available, e.g. first channel tuned to after a power cycle, there can be, for example, an audible beep and the receiver can remain tuned to the current channel.

JumpSet

JumpSet is when the Jump button is chosen to act as an enhanced Preset button. Setting of the JumpSet can be the same as any other conventional preset button: while listening to any system channels, a press and hold of the Jump button saves the current channel as the JumpSet channel. When a channel is saved as a JumpSet, the band indicator will change to the Jump button icon to indicate that the current channel is associated with the Jump button, as shown in FIG. 14(*a*).

Figure 14A:
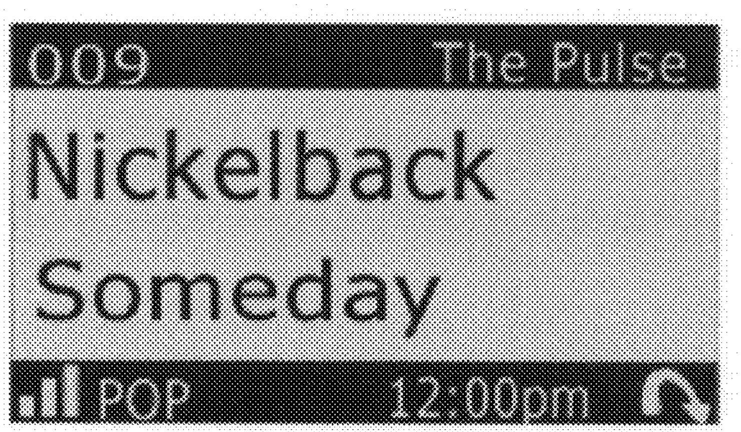
Figure 14B:
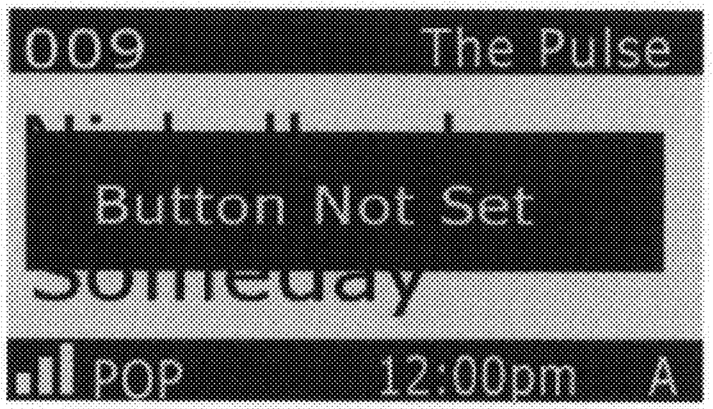

If the Jump button Setting is determined to be a JumpSet, before a JumpSet channel is chosen, pressing and releasing of the Jump button yields a pop-up “Button Not Set” as shown in FIG. 14(*b*). If the channel is set, pressing and releasing the Jump button tunes the receiver to the JumpSet channel immediately. If that channel is the current channel, the receiver tunes to the previous channel. If no previous channel is available, e.g. first channel tuned to after a power cycle, there shall be an audible beep and the receiver remains tuned to the current channel.

When set, the JumpSet channel can function as any other presets in a Preset Tuning Mode. The JumpSet channel can be displayed in the Preset list before bank A, and can be available via CH+/CH− before bank A or after bank C.

Replace

In exemplary embodiments of the present invention, a traffic city ID can be replaced by changing it in the Menu Option—Jump Setting—Choose Traffic Market, as described above. The JumpSet channel can be replaced by programming another channel as the JumpSet channel.

Figure 15:
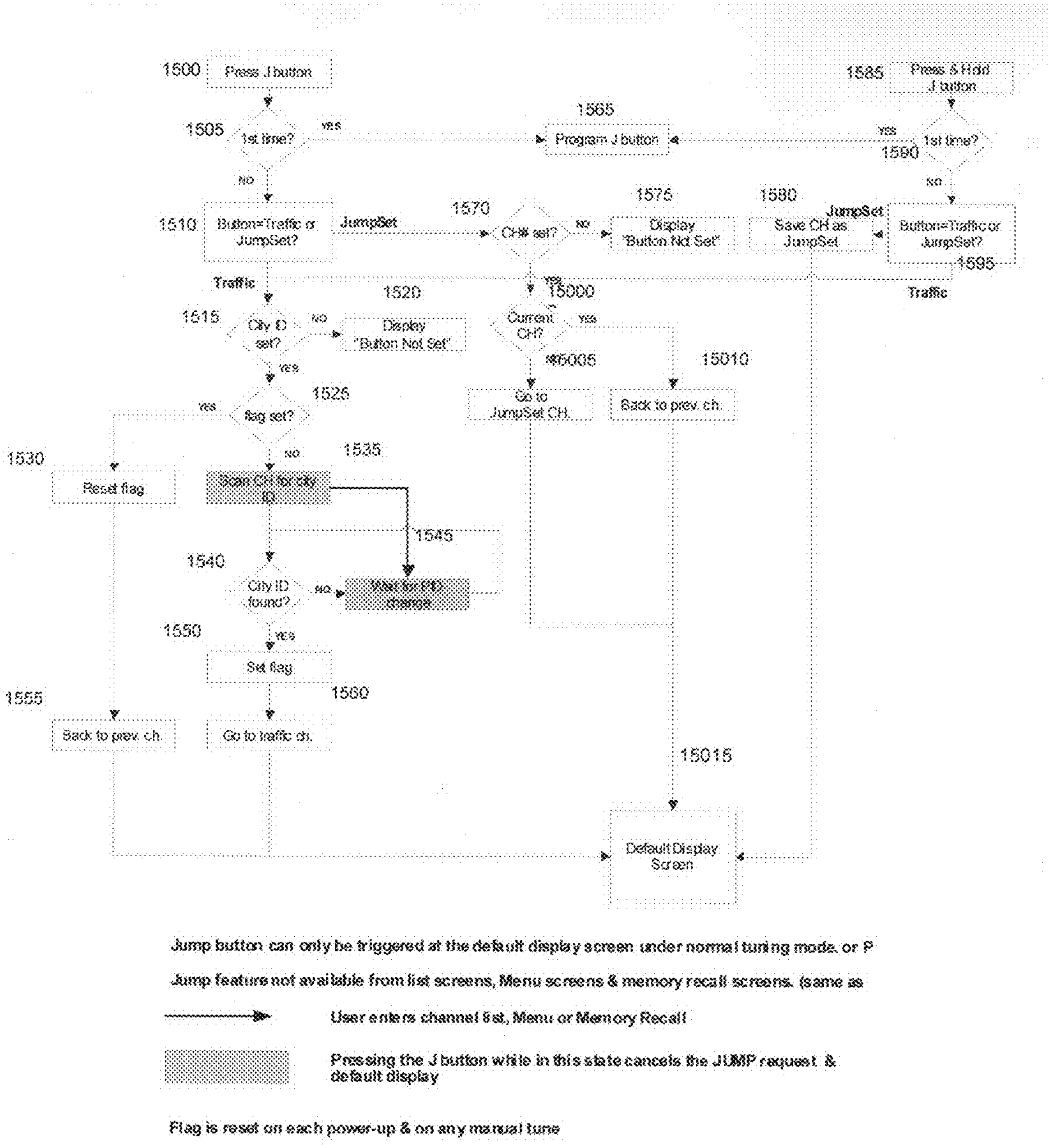

To summarize the above description, FIG. 15 illustrates the user interface process flow while using the Jump button.

In exemplary embodiments of the present invention, a receiver can have internal memory to store the traffic city IDs for current channel map, the user's city choice and any user selected JumpSet channel.

FIG. 16 depicts exemplary three letter city codes for use in traffic designations in exemplary embodiments of the present invention.

III. Auxiliary Data Streams

In what has been described thus far, the content regarding which a user can be alerted is available on some other channel within the multichannel broadcast system. Thus a user has a choice of whether to jump to, for example, a traffic report or a particular sports game, or whether to simply have a virtual scoreboard or traffic message displayed without changing channels. What is next described are exemplary auxiliary data streams, not associated with any particular channel's content, which can be displayed as text on a receiver display screen while a user listens to a given channel of interest.

Stock and Financial Data

In exemplary embodiments of the present invention, a stock ticker datastream can be sent in a series of service channel messages. What is next described are the physical architecture, message syntax and control methodologies between a stock ticker server and a multichannel broadcast system to support real time streaming of stock symbols. The described example embodiment shall be sometimes referred to as "Stock Ticker."

In exemplary embodiments, a broadcasting service can, for example, interface to a real time, or real-time 20 minute delayed, provider of stock price information and can, for example, filter it to provide pricing for individual stocks from the three main US exchanges, American Stock Exchange, NYSE and NASDAQ. Additionally, major indices can also be carried in the service, such as DJIA, S&P 500, etc. In an exemplary embodiment of the present invention, it is expected that approximately 6600 instrument values can be transmitted and that such values can change every 2.5 minutes. This information can be carried in a service channel, for example, as a distinct type of a Data over Service Channel (DOSC) message.

In an exemplary embodiment of the present invention, a receiver can provide a mechanism to choose up to 20 stocks for display on a scrolling ticker. The receiver can, for example, display ticker symbol, price and price change since session opening. The receiver can, for example, contain a list of 6500 active stocks in ROM, and facilitate selection of these stocks to a personalized ticker.

To facilitate new stocks (IPO's, etc.) being added to the list, an exemplary system can also, for example, transmit a list of new stock symbols as an update table every 15 to 30 minutes. This update table can, for example, be stored in non volatile memory in the receiver.

In an exemplary embodiment of the present invention, the number of stocks covered by the service can be approximately 6600. It can grow larger as more stocks are added. The information for each stock can, for example, include the following:

Stock Index—a 14 bit number used as a unique identifier within this service. This permits up to 16384 unique stock symbols to be handled.

Stock Ticker—typically a string of 1-8 uppercase characters. Up to 28 characters is permitted.

Stock Price in Cents—Any integer in the range from 0 to $168512.04

Daily Change in Cents—Any integer with magnitude not exceeding $739.88.

In some embodiments of the present invention, where service channel messaging bandwidth is fully utilized, in order to carry additional payload, changes may need to be made to service channel modes which can cause a reduction of bandwidth available for audio channels.

The Data Descriptor Message format of FIG. 2 can, in exemplary embodiments of the present invention, be modified slightly as noted below to carry financial instrument data such as in Stock Ticker. PAYLOAD_TYPE can, for example, be extended to include Type 2=Compression using Stock Ticker algorithm (TBD) and Type 3=Compression using Update Table algorithm. Additionally, in exemplary embodiments of the present invention DOSC_ID values can for example be extended to include two new message types 4 and 5 as outlined in Table I below.

In the Data Descriptor Message, the SEQ_ID field indicates whether the PAYLOAD contained in the message is self-contained (SEQ_ID=3), the first in a sequence of messages (SEQ_ID=1), the intermediate in a sequence messages (SEQ_ID=0), or the last in a sequence of messages (SEQ_ID=2). In Stock Ticker, for example, there shall only be one multi-message sequence at any one time. For example, if a sequence is started with SEQ_ID=1 and another SEQ_ID=1 is encountered before a SEQ_ID=2 is encountered, the first sequence shall be deemed invalid and discarded. However, a SEQ_ID=3 message can arrive at any time, even during a multi-message sequence. The PAYLOAD_TYPE field indicates the format of PAYLOAD. If PAYLOAD_TYPE=0, the data is uncompressed. If PAYLOAD_TYPE=1, the data is compressed using RHC compression. If PAYLOAD_TYPE=2; the data is compressed using Stock Ticker compression algorithm (TBD). If PAYLOAD_TYPE=3, the data is compressed using Update Table compression algorithm (TBD).

To support many different types of data, the DOSC_ID field can thus be used to indicate the type of data contained in the PAYLOAD field of the Data Descriptor Message. Table I contains exemplary valid values for DOSC_ID in an exemplary embodiment of the present invention which implements LAPDT, time and date, and Stock Ticker messaging. As described above, LAPDT messaging can also be used for traffic and game alerts, as well as for providing an auxiliary datastream of sports scores.

TABLE I

Valid Values for DOSC_ID

| DOSC_ID Value | Type of Data | Comment |
|---|---|---|
| 0 | Look-Around PDT | Contains PDT for one or more channels |
| 1 | Time of Day | Contains the time and date |
| 2 | Extended Cluster Descriptor Message | Contains number of extended channels beyond those contained in a Cluster Descriptor Message |
| 3 | Extended Channel Identification Message | Contains the definition of channels defined by an Extended Cluster Descriptor Message |
| 4 | Stock Ticker | Contains stock symbol, index, price and price change information. |

TABLE I-continued

| Valid Values for DOSC_ID | | |
|---|---|---|
| DOSC_ID Value | Type of Data | Comment |
| 5 | Stock Ticker Update Table | Contains stock symbol and index information for new stocks (Not in ROM in receiver) |

The SEQ_NUM field contains a modulo-256 sequence number. In exemplary embodiments of the present invention, the SEQ_NUM shall only be incremented when SEQ_ID is not equal to 3. The SEQ_NUM field usually will not, for example, be reset for each message sequence so as to allow the receiver to easily distinguish between messages in a particular sequence and from sequence to sequence. For example, for a three message sequence with SEQ_NUM values of 255, 0, and 1, the next four message sequence would have SEQ_NUM values of 2, 3, 4, and 5.

The PAYLOAD field contains the actual data payload. The format of the PAYLOAD field is dependent on the value of DOSC_ID.

New DOSC Data Types

Stock Ticker (DOSC_ID=4)

In exemplary embodiments of the present invention to facilitate the transmission of stock ticker pricing information a new DOSC message type can be defined with DOSC_ID=4.

Sequence Type

In exemplary embodiments for Stock Ticker, the message sequence length is always one message (i.e. SEQ_ID=3).

Payload Format

FIG. 23 depicts an exemplary payload format for Stock Ticker. For Stock Ticker, the PAYLOAD_FORMAT field of the Data Descriptor Message can be set to 0 (uncompressed) or 2 (compressed with Stock Ticker algorithm TBD). If PAYLOAD_FORMAT=2, the PAYLOAD field contained in the Data Descriptor Message must be uncompressed before processing in exemplary embodiments. However the STOCK_INDEX and STOCKS_IN_MESSAGE can be always uncompressed and may be examined to determine if a stock of interest is contained in a current message.

To avoid the overhead of sending ASCII stock symbols for each stock, an index value can for example be assigned and maintained by a Stock Ticker server. Each index value is unique and can also, for example, be stored in non-volatile memory in the receiver.

The STOCK_INDEX field can contain a 14 bit unsigned value representing the stock symbol lookup for the first stock price and change value in the PAYLOAD. All stocks contained within this message can, for example, have concurrent values, such that only one index value needs to be transmitted per message. If a radio receives a STOCK_INDEX value which is not currently in memory in the receiver, it can, in such exemplary embodiment, be discarded.

The STOCKS_IN_MESSAGE field can, for example, contain an 8 bit value which is the count of the number of stock price and change value pairs contained in the current message. The PAYLOAD field can contain stock price and change values packed as specified below.

Value Range and Stock Price

To encode a stock price a VALUE_RANGE (VR) followed by a STOCK_PRICE, expressed in cents can, for example, be utilized, as follows in Table J:—

TABLE J

| Value Range and Stock Value | | | |
|---|---|---|---|
| Value Range | Bits for Stock Price | Stock Price (cents) | Comment |
| 00 | 8 | 0-255 | $2^{nd}$ most common range |
| 01 | 13 | 256-8452 | Most common range |
| 10 | 16 | 8453-73988 | |
| 11 | 24 | 73989-16851204 | |

Price Change from Opening Price.

In exemplary embodiments of the present invention a radio can for example, display Symbol, Stock Price and Change from the opening price. The CHANGE_VALUE, SIGN_BIT and VALUE_RANGE_CHANGE fields can be coded as shown below.

TABLE K

| Price Change Symbol | | | |
|---|---|---|---|
| Sign Bit | Bits | Value | Comment |
| + | 1 | 0 | Price change is 0 or positive |
| − | 1 | 1 | Price change is negative |

TABLE L

| Value Range Change | | | |
|---|---|---|---|
| Value Range Change | Bits for Change Value | Change Value (cents) | Comment |
| 00 | 8 | 1-255 | |
| 01 | 13 | 256-8452 | Most common value at EOD |
| 10 | 16 | 8453-73988 | |
| 11 | 0 | N/A | Change value not included in message |

It is noted that when the CHANGE_VALUE=0, i.e. the current STOCK_PRICE is the same as the start of day price, only a VALUE_RANGE_CHANGE="11" need be transmitted and the CHANGE_VALUE can be omitted from the message.

FIG. 24 depicts an exemplary typical payload message with a single STOCK_INDEX and STOCK_PRICE in the \$2.56-\$84.52 range and a VALUE_RANGE_CHANGE \$2.56-\$84.52.

In exemplary embodiments of the present invention, it is often desirable to maximize the number of STOCK_PRICE/CHANGE_VALUE pairs that can fit into the maximum message size, as only a single STOCK_INDEX has to be sent in each message.

Payload Calculation

In exemplary embodiments of the present invention, the max DOSC message size is 255 bytes. For a message where SEQ_ID=3 (single message) the Data Descriptor Message header=2 bytes thus leaving 253 bytes for Stock header and payload.

If it is assumed that the average, stock is in the price range 2.56-84.52 and its daily change is in the range +/−\$2.56 to 23.04 then (2+13+1+2+13)=13 bits/stock are required.

The STOCK_INDEX and STOCKS_IN_MESSAGE require 14+8=22 bits. Because in this exemplary embodiment 253 bytes are available (equal to 2024 bits), 2024−22=2002 bits are available for stock information. 2002/31 bits/stock yields a maximum of 64 stocks in an average message.

Thus, the total rate for 64 stocks is (bits for 64 stocks)+(Stock Message Header)+(Data Descriptor Header)=(64*31)+22+16=2022 bits. Therefore, the total bits for 6600 stocks is (2002/64)*6600=208518 bits. If this is transmitted in a 2.5 minute cycle then this would be 1390 bps.

Update Symbol Table (DOSC_ID=5)

To facilitate the future addition of Stock Symbols (IPO's, and symbol changes) in exemplary embodiments of the present invention, a receiver should also support the notion of an update symbol table. The index of this table would follow sequentially from the main stock symbol table, such that if the last entry in the stock symbol table was N, the first entry in the first Update Symbol table is N+1. The update symbol table can, for example, be broadcast less frequently than the stock prices. The update table can, for example, be stored in the radio in non-volatile memory.

To facilitate the transmission of stock ticker pricing information a new DOSC message type can, for example, be defined with DOSC_ID=5.

In addition to a TABLE_NUMBER for identification, the body of the update table can, for example, contain a 14 bit STOCK_INDEX and some number of run length delimited STOCK_SYMBOL(s).

Sequence Type

For the Update Symbol Table, the message sequence length may be contained in a single message (i.e. SEQ_ID=3), or may span multiple messages (SEQ_ID=1) for the first in a sequence of messages, the intermediate in a sequence of messages (SEQ_ID=0), or the last in a sequence of messages (SEQ_ID=2). There shall only be one multi-message sequence at any one time. For example, if a sequence is started with SEQ_ID=1 and another SEQ_ID=1 is encountered before a SEQ_ID=2 is encountered, the first sequence shall be deemed invalid and discarded. However, a SEQ_ID=3 message can arrive at any time, even during a multi-message sequence.

Payload Format

For Stock Ticker, the PAYLOAD_FORMAT field of the Data Descriptor Message may be set to 0 (uncompressed) or 3 (compressed with Update Table algorithm TBD). If PAYLOAD_FORMAT=3, the PAYLOAD field contained in the Data Descriptor Message must be uncompressed before processing.

However, the TABLE_NUMBER and FINALIZE fields are usually uncompressed and may be examined to determine if the message should be processed.

FIG. 25 depicts an exemplary Update Symbol Table Message for Stock Ticker. With reference to FIG. 25, in exemplary embodiments of the present invention, the fields can be defined as follows. TABLE_NUMBER can all contain a 6 bit value to identify the table, starting at TABLE_NUMBER="000000". A Stock Ticker server can, for example, append stocks to this table until a decision is made to FINALIZE the table. Once a table has been FINALIZED, for example, no additional STOCK_SYMBOL or STOCK_INDEX can be allowed to be added to the table. New stocks can thus be added to a next table, such as, for example, where TABLE_NUMBER="000001".

This latter feature prevents an Update Table from becoming ever larger. It may, for example, permit Update Tables to be transmitted for a period of time, and then discontinued when all receivers are deemed to have the update. Receivers can, for example, ignore a finalized update table message once they are synchronized with a finalized copy.

The remaining fields in FIG. 25 can be defined as follows:

FINALIZE

0=Update Table NOT Finalized, available to append Stock Symbols

1=Update Table Finalized, no additional information may be appended.

EXTENDED_RUNLENGTH

0=Stock Symbol Runlength Counter (SRLC) 3 bits for this message (Up to 8 Characters for Stock Symbol)

1=Stock Symbol Runlength Counter (SRLC) counter 6 bits for this message (Up to 28 Characters for Stock Symbol)

Currently all stock symbols from the three US exchanges have a short stock symbol of 8 characters or less. However up to 28 characters are available, in exemplary embodiments of the epresent invention, for this information. To facilitate this, for example, as new stocks are introduced, or for symbols which do not conform to this limit, EXTENDED_RUNLENGTH=1 covers this case.

FIG. 26 depicts an exemplary Typical Update Symbol Table Message. With reference thereto, the fields are described as follows. A STOCK_INDEX field can contain a unique 14 bit index for the first STOCK_SYMBOL in the current message. A STOCKS_IN_MESSAGE field can, for example, contain an 8 bit value which is the count of the number of SRLC and STOCK_SYMBOL pairs contained in the current message.

In exemplary embodiments of the present invention, no partial STOCK_SYMBOL(s)/SRLC pairs shall be sent. The last byte of a payload can, for example, be stuffed with 0's as necessary to be byte aligned and shall be ignored by the receiver. SRLC—Stock Runlength Counter can be a 3 or 8 bit runlength value for the following stock. In exemplary embodiments of the present invention only one runlength type (either 3 or 8) is permitted per message. Table M below is an exemplary runlength table for the 3 bit counter.

TABLE M

SRLC Stock Runlength Counter Table

| SRLC | STOCK_SYMBOL (Number of Characters) |
|---|---|
| 000 | 1 |
| 001 | 2 |
| 010 | 3 |
| 011 | 4 |
| 100 | 5 |
| 101 | 6 |
| 110 | 7 |
| 111 | 8 |

Stock Symbol Table

A STOCK_SYMBOL can, for example, be 1-28 characters and coded as 5 bit values as shown in Table N below:

TABLE N

Stock Symbol Table

| Character | Value |
|---|---|
| A | 00000 |
| B | 00001 |
| C | 00010 |
| D | 00011 |
| E | 00100 |
| F | 00101 |
| G | 00110 |
| H | 00111 |
| I | 01000 |

TABLE N-continued

| Stock Symbol Table | |
|---|---|
| Character | Value |
| J | 01001 |
| K | 01010 |
| L | 01011 |
| M | 01100 |
| N | 01101 |
| O | 01110 |
| P | 01111 |
| Q | 10000 |
| R | 10001 |
| S | 10010 |
| T | 10011 |
| U | 10100 |
| V | 10101 |
| W | 10110 |
| X | 10111 |
| Y | 11000 |
| Y | 11001 |
| Z | 11010 |
| . | 10111 |
| + | 11000 |
| − | 11001 |
| * | 11010 |
| / | 11011 |
| Reserved for Future | 11100 |
| Reserved for Future | 11101 |
| Begin Extended Table Sequence | 11110 |
| End Extended Table Sequence | 11111 |

Extended Stock Symbol Table

Currently all US equities have only alpha characters and can be fully described in Table N. However, to facilitate the need to support stock index symbols (such as S&P500), which do require numerical values, as well as other future needs, a Stock Symbol Extension table can, for example, be defined as in Table O below. This negates the need to define a longer symbols table for most stocks.

TABLE O

| Extended Stock Symbol Table | |
|---|---|
| Character | Value |
| 0 | 00000 |
| 1 | 00001 |
| 2 | 00010 |
| 3 | 00011 |
| 4 | 00100 |
| 5 | 00101 |
| 6 | 00110 |
| 7 | 00111 |
| 8 | 01000 |
| 9 | 01001 |
| Reserved for Future | 01010 |
| Reserved for Future | 01011 |
| Reserved for Future | 01100 |
| Reserved for Future | 01101 |
| Reserved for Future | 01110 |
| Reserved for Future | 01111 |
| Reserved for Future | 10000 |
| Reserved for Future | 10001 |
| Reserved for Future | 10010 |
| Reserved for Future | 10011 |
| Reserved for Future | 10100 |
| Reserved for Future | 10101 |
| Reserved for Future | 10110 |
| Reserved for Future | 10111 |
| Reserved for Future | 11000 |
| Reserved for Future | 11001 |
| Reserved for Future | 11010 |

TABLE O-continued

| Extended Stock Symbol Table | |
|---|---|
| Character | Value |
| Reserved for Future | 10111 |
| Reserved for Future | 11000 |
| Reserved for Future | 11001 |
| Reserved for Future | 11010 |
| Reserved for Future | 11011 |
| Reserved for Future | 11100 |
| Reserved for Future | 11101 |
| Reserved | 11110 |
| Reserved | 11111 |

Thus, in exemplary embodiments of the present invention an exemplary message construction for Stock Ticker messages can, for example, be as follows:

. . . <Stock Symbol Value> <Begin Extended Table Sequence (11110)> <Extended Table Symbol> . . . . <Extended Table Symbol> <End Extended Table Sequence(11111)> <Stock Symbol Value> . . . .

User Interface

In exemplary embodiments of the present invention a user can be alerted by, and can input his or her criteria for desired updates using, a variety of user/receiver interfaces according to conventional techniques. For example, such interface embodiments can include, on the output side (e.g., output to a user), audible alert messages such as, for example, tones, bells, or spoken text generated by a voice synthesizer in the receiver, as well as, for example, textual displays. On the input side (e.g., input from a user) a user can interact, for example, with menu driven displays with selection buttons, arrow keys, or knobs, to store user defined sets of criteria for the various message types as described above.

The present invention has been described in connection with exemplary embodiments and implementations, as examples only. It is understood by those having ordinary skill in the pertinent arts that modifications to any of the exemplary embodiments or implementations can be easily made without materially departing from the scope or spirit of the present invention.

What is claimed:

1. In a multichannel broadcast system, a method of alerting a user of predetermined content other than the content provided on a channel currently being played to a user, comprising:

associating the predetermined content with a unique identifier;

storing the unique identifier associated with the predetermined content at a receiver;

receiving the unique identifier at the receiver;

identifying the received unique identifier as a match for the user; and at least one of switching the user to the channel where predetermined content is provided, alerting the user as to the channel where the predetermined content is provided, and providing the user with the predetermined content via one of textual and graphic display, wherein the predetermined content is located by processing one or more subfields of the unique identifier according to predetermined rules.

2. The method of claim 1, wherein the predetermined content is one of a plurality of predetermined contents identified by a user.

3. The method of claim 2, wherein each of the plurality of predetermined contents has a respective unique identifier.

4. The method of claim 1, wherein said associating the predetermined content is in response to a user action input to the receiver.

5. The method of claim 4, wherein the predetermined contents belong to a virtual category selected by a user.

6. The method of claim 1, wherein the predetermined content of is traffic information meeting certain user defined criteria.

7. The method of claim 6, wherein said user defined criteria include one or more of location, sublocation, traffic incident type, and severity of traffic.

8. The method of claim 1, wherein the unique identifier is embedded in at least one of:

program descriptive text transmitted within an audio channel; and look-around program descriptive text transmitted in a service channel message.

9. The method of claim 1, wherein the unique identifier is embedded in a non LAPDT service channel message.

10. The method of claim 1, wherein the unique identifier is associated with traffic, sports, news, financial, or other content on a channel not currently being received.

11. The method of claim 10, wherein the unique identifier has a format by which it can be clearly distinguished from a field in a program descriptive text message.

12. The method of claim 1, wherein the unique identifier is associated with auxiliary data not transmitted on any audio channel in the system.

13. In a multichannel audio broadcast system, a method of providing auxillary data of interest to users, comprising:

sending a datastream of auxiliary data in a service channel;

associating each datum in the datastream with a unique identifier;

providing data to a user when the unique identifier matches a category selected by the user, wherein the auxiliary data is located by processing one or more subfields of the unique identifier according to predetermined rules.

14. The method of claim 13, wherein the category is a virtual category.

15. The method of claim 13, wherein the auxiliary data is at least one of premium traffic data, traded instrument prices, weather and sports scores.

16. The method of claim 13 where the auxiliary data is sent in a pre-existing service channel message format.

17. The method of claim 16, wherein the pre-existing service channel message format transmits program descriptive text.

18. In a multichannel broadcast system, a method of alerting a user of predetermined content other than the content provided on a channel currently being played to a user, comprising:

associating the predetermined content with a unique identifier;

storing the unique identifier associated with the predetermined content at a receiver; receiving the unique identifier at the receiver;

identifying the received unique identifier as a match for the user; and at least one of switching the user to the channel where predetermined content is provided, alerting the user as to the channel where the predetermined content is provided, and providing the user with the predetermined content via one of textual and graphic display, wherein the unique identifier is associated with traffic, sports, news, financial, or other content on a channel not currently being received, and wherein the unique identifier has a format by which it can be clearly distinguished from a field in a program descriptive text message.

* * * * *